United States Patent
Nara et al.

(10) Patent No.: US 10,018,732 B2
(45) Date of Patent: Jul. 10, 2018

(54) INFORMATION PROCESSING APPARATUS AND INFORMATION PROCESSING SYSTEM

(71) Applicant: CLARION CO., LTD., Saitama (JP)

(72) Inventors: Norikazu Nara, Irvine, CA (US); Stephen Chiu, Newport Coast, CA (US); Megumi Kawata, Irvine, CA (US)

(73) Assignee: CLARION CO., LTD., Saitama-Shi, Saitama (JP)

(*) Notice: Subject to any disclaimer, the term of this patent is extended or adjusted under 35 U.S.C. 154(b) by 234 days.

(21) Appl. No.: 14/976,316

(22) Filed: Dec. 21, 2015

(65) Prior Publication Data

US 2017/0176601 A1 Jun. 22, 2017

(51) Int. Cl.
*G01C 21/20* (2006.01)
*G01S 19/46* (2010.01)
*G01S 19/14* (2010.01)
*G01S 19/45* (2010.01)

(52) U.S. Cl.
CPC .............. *G01S 19/46* (2013.01); *G01S 19/14* (2013.01); *G01S 19/45* (2013.01)

(58) Field of Classification Search
None
See application file for complete search history.

(56) References Cited

U.S. PATENT DOCUMENTS

| | | | |
|---|---|---|---|
| 2008/0117100 A1 | 5/2008 | Wang et al. | |
| 2008/0294342 A1* | 11/2008 | Hoshizaki | G01C 21/165 701/472 |
| 2009/0018772 A1* | 1/2009 | Watanabe | G01C 21/165 701/472 |
| 2009/0030607 A1 | 1/2009 | Sakata et al. | |
| 2009/0063051 A1* | 3/2009 | Watanabe | G01C 21/165 701/472 |
| 2014/0309924 A1* | 10/2014 | Varoglu | G01C 21/206 701/410 |
| 2015/0362322 A1 | 12/2015 | Ozaki | |
| 2016/0061613 A1 | 3/2016 | Jung et al. | |
| 2016/0209218 A1 | 7/2016 | Lacher | |

FOREIGN PATENT DOCUMENTS

| | | |
|---|---|---|
| JP | 2002-286492 A | 10/2002 |
| WO | 2014/171734 A2 | 10/2014 |
| WO | 2015/018513 A1 | 2/2015 |

OTHER PUBLICATIONS

Garin Lionel J et al. "Enhancing Altitude Accuracy in Automotive Navigation using MEMS Barometric Sensor with GPS", ION NTM 2008, Jan. 28-30, 2008, San Diego, CA, pp. 670-679.
Extended European Search Report dated May 30, 2017 in the corresponding European patent application No. 16 20 5333.4-1812.

* cited by examiner

*Primary Examiner* — Thomas G Black
*Assistant Examiner* — Demetra R Smith-Stewart
(74) *Attorney, Agent, or Firm* — IP Business Solutions, LLC

(57) ABSTRACT

A portable terminal includes a GPS unit configured to receive a GPS signal, a GPS processing section configured to detect GPS accuracy at an interval and detect the position of a vehicle on the basis of the GPS signal received by the GPS unit, and an information processing section configured to detect entrance timing, which is timing when the GPS accuracy is detected when the vehicle is located at an entrance point of a multi-storey parking structure, on the basis of transition of the GPS accuracy detected by the GPS processing section at the interval.

11 Claims, 10 Drawing Sheets

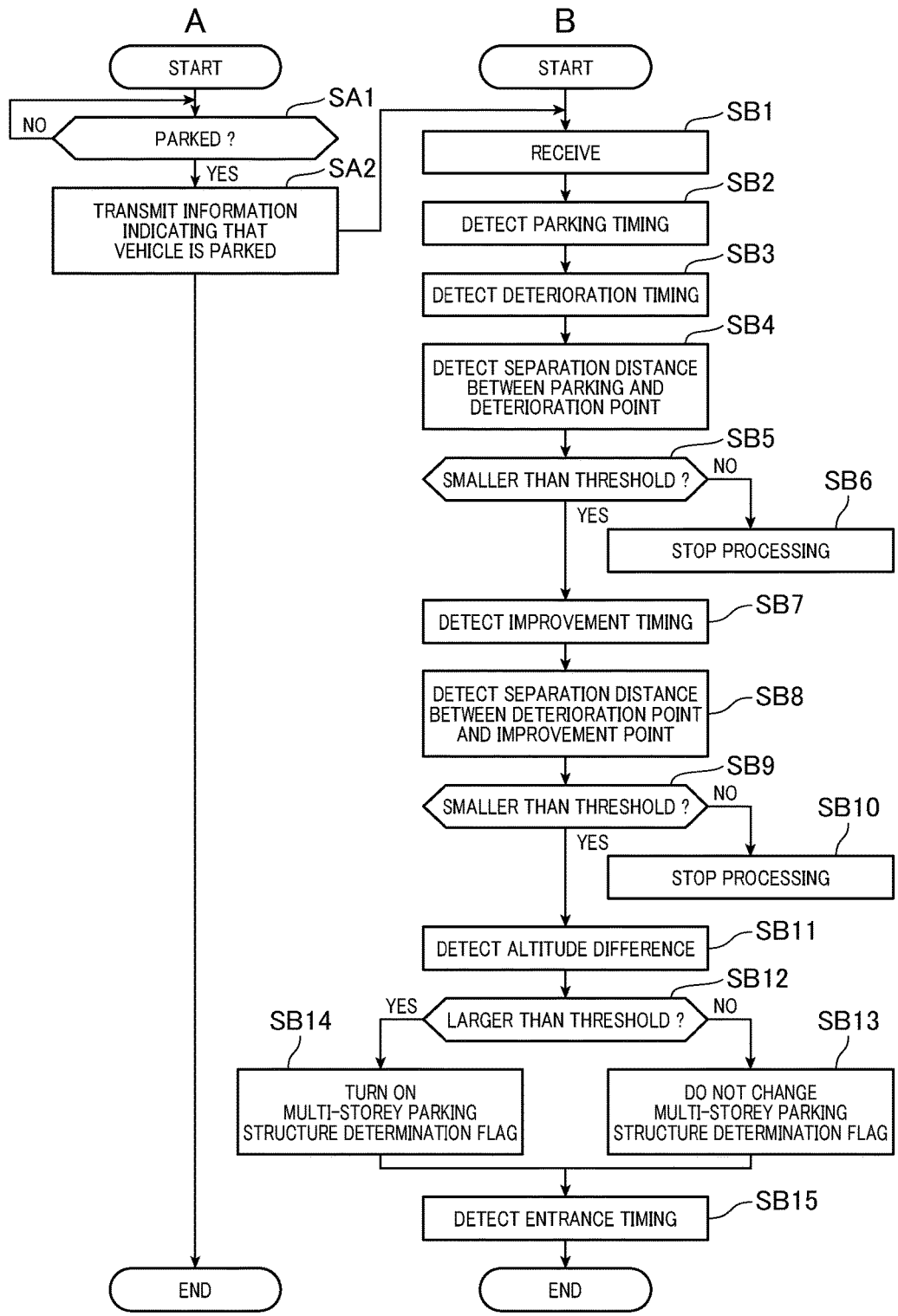

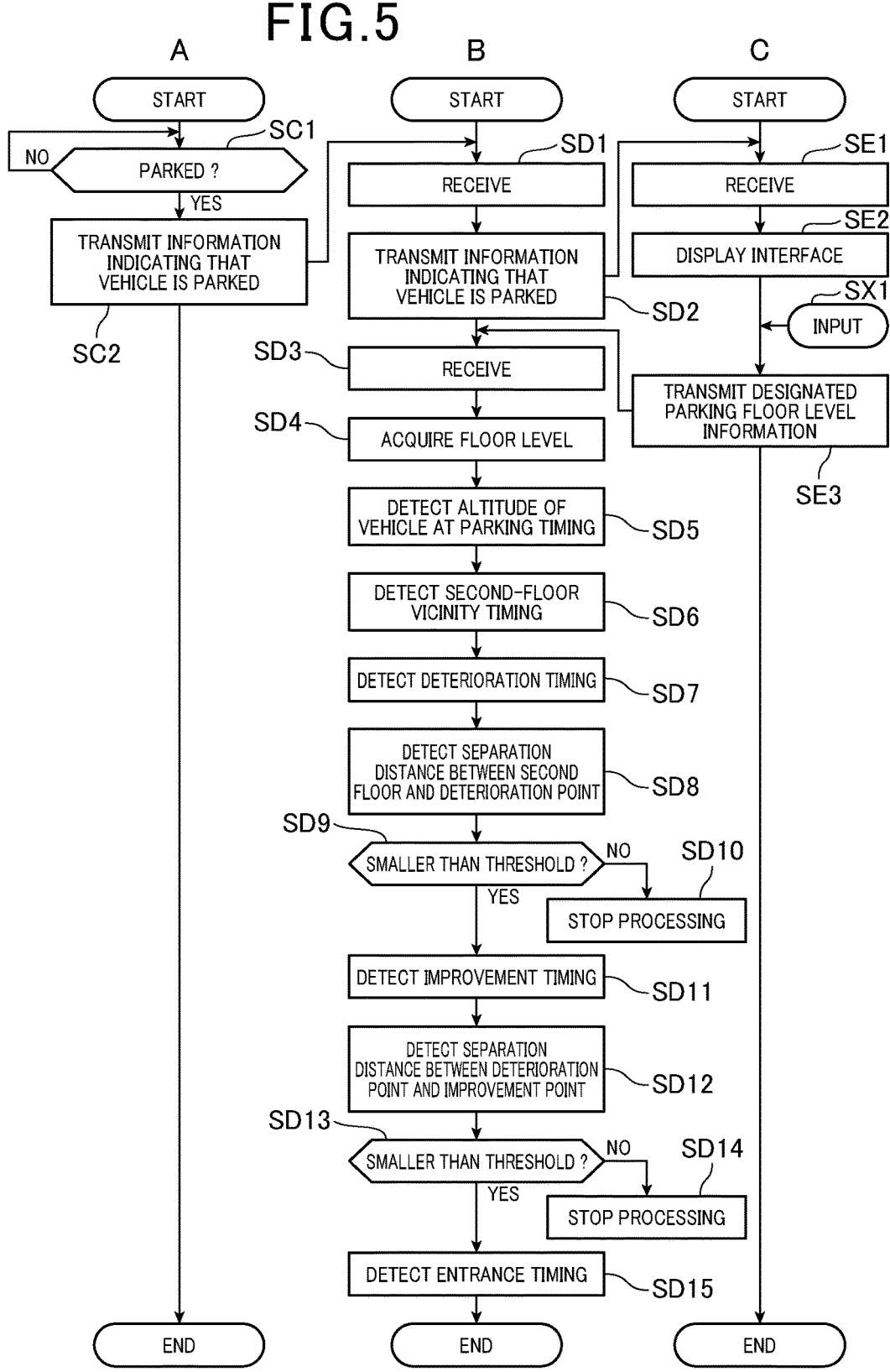

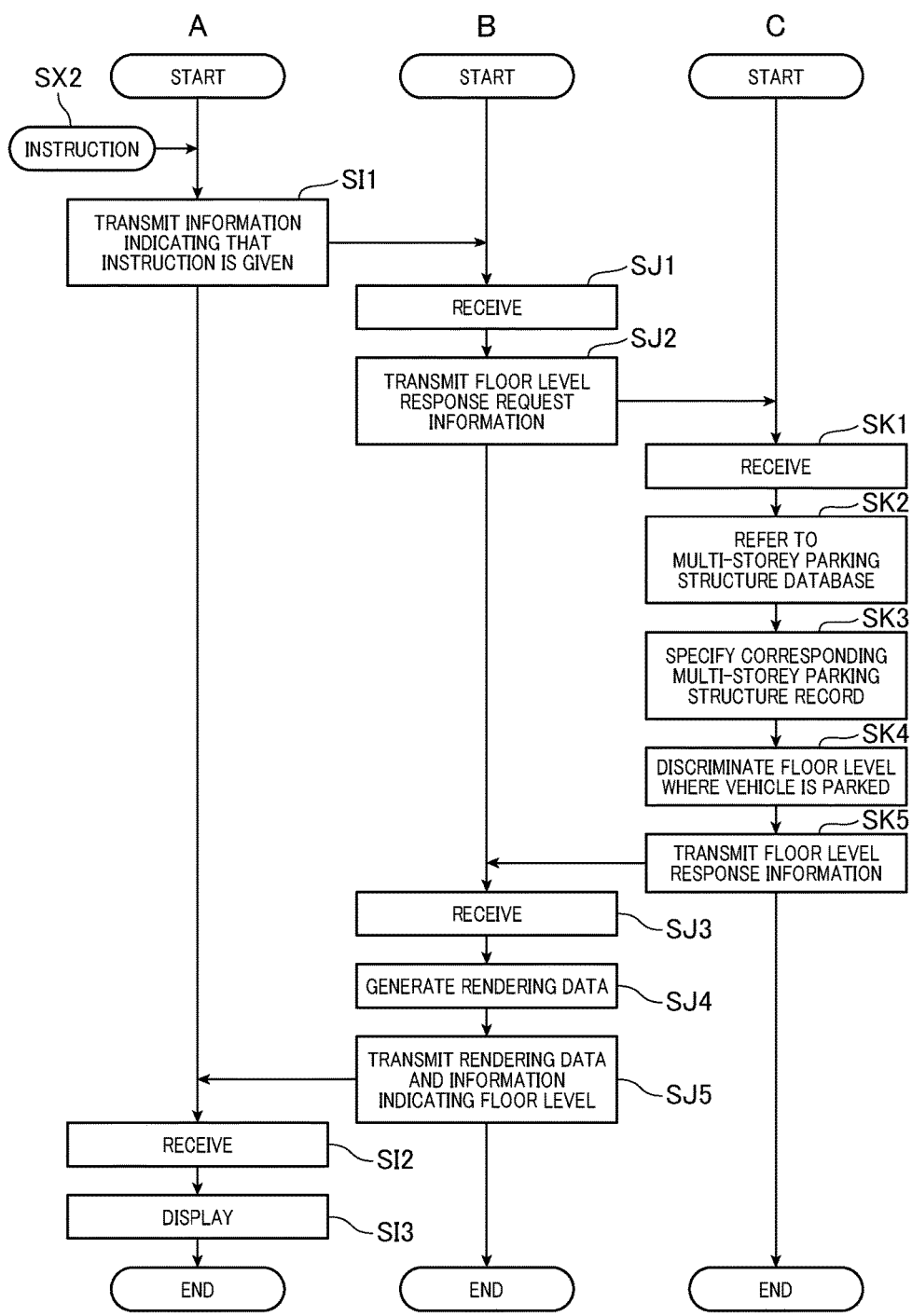

INFORMATION PROCESSING APPARATUS AND INFORMATION PROCESSING SYSTEM

BACKGROUND OF THE INVENTION

Field of the Invention

The present invention relates to an information processing apparatus and an information processing system.

Description of the Related Art

There has been known an information processing apparatus (a portable navigation apparatus) that detects altitude (height) at one point according to an instruction involving predetermined operation of a user, detects, according to an instruction involving the predetermined operation of the user, altitude (height) at another point located at altitude different from the one point, and detects the relative height of the other point based on the one point (see, for example, Japanese Patent Application Laid-Open No. 2002-286492 (Patent Literature 1)).

Incidentally, a vehicle is sometimes parked in a multi-level structure such as a multi-storey parking structure. When the vehicle is parked in the multi-level structure, if the relative height of a parking position based on an entrance in the multi-level structure can be detected, it is possible to perform, on the basis of the detected relative height, beneficial processing for, for example, detecting a floor level where the vehicle is parked. In order to detect the relative height, it is necessary to acquire the altitude of the vehicle at timing when the vehicle is located at the entrance of the multi-level structure. However, when the altitude of the vehicle at the timing when the vehicle is located at the entrance of the multi-level structure is acquired making use of Patent Literature 1, a user needs to perform predetermined operation. The predetermined operation is complicated for the user. The user cannot always accurately perform the predetermined operation when the vehicle is located at the entrance of the multi-level structure. On the other hand, in order to acquire, without involving the operation of the user, the altitude of the vehicle at the timing when the vehicle is located at the entrance of the multi-level structure, it is necessary to make it possible to automatically appropriately detect the timing when the vehicle is located at the entrance of the multi-level structure.

SUMMARY OF THE INVENTION

The present invention has been devised in view of the above circumstances and has an object of enabling an information processing apparatus, which processes information concerning a multi-level structure including a plurality of floor levels where a vehicle can be parked, to appropriately detect timing when the vehicle is located at an entrance of the multi-level structure.

In order to attain the object, the present invention provides an information processing apparatus that processes information concerning a multi-level structure including a plurality of floor levels where a vehicle can be parked, the information processing apparatus including: a GPS receiving section configured to receive a GPS signal; a GPS processing section configured to detect GPS accuracy at an interval and detect the position of the vehicle on the basis of the GPS signal received by the GPS receiving section; and an information processing section configured to detect entrance timing, which is timing when the GPS accuracy is detected when the vehicle is located at an entrance point of the multi-level structure, on the basis of transition of the GPS accuracy detected by the GPS processing section at the interval.

In the information processing apparatus, the information processing section may detect, on the basis of the transition of the GPS accuracy detected by the GPS processing section at the interval, deterioration timing, which is timing when the GPS accuracy deteriorates to exceed a deterioration determination accuracy threshold first, tracking back from parking timing, which is timing when the GPS accuracy is detected when the vehicle is parked at a parking point in the multi-level structure, further detect improvement timing, which is timing when the GPS accuracy improves to be smaller than an improvement determination accuracy threshold, which is smaller than the deterioration determination accuracy threshold, first, tracking back from the deterioration timing, and set the improvement timing as the entrance timing.

In the information processing apparatus, the information processing section may set the improvement timing as the entrance timing when a separation distance between the position of the vehicle at the parking timing and the position of the vehicle at the deterioration timing is smaller than a parking/deterioration point distance threshold.

In the information processing apparatus, the information processing section may set the improvement timing as the entrance timing when a separation distance between the position of the vehicle at the deterioration timing and the position of the vehicle at the improvement timing is smaller than a deterioration/improvement point distance threshold.

The information processing apparatus may further include an altitude detecting section configured to detect the altitude of the vehicle at an interval corresponding to the interval at which the GPS processing section detects the GPS accuracy. In the information processing apparatus, the information processing section may acquire the floor level where the vehicle is parked input from a user, detect, on the basis of the acquired floor level where the vehicle is parked, transition of the altitude of the vehicle detected by the altitude detecting section at the interval, and a floor level width decided in advance as width in the height direction between the floor levels in the multi-level structure, second-floor vicinity timing, which is timing when altitude corresponding to the altitude of a second floor of the multi-level structure is detected as the altitude of the vehicle first, tracking back from the parking timing, detect, tracking back from the second-floor vicinity timing, deterioration timing when the GPS accuracy deteriorates to exceed a deterioration determination accuracy threshold first, further detect, improvement timing, which is timing when the GPS accuracy improves to be smaller than an improvement determination accuracy threshold, which is smaller than the deterioration determination accuracy threshold, first, tracking back from the deterioration timing, and set the improvement timing as the entrance timing.

In the information processing apparatus, the information processing section may set the improvement timing as the entrance timing when a separation distance between the position of the vehicle at the second-floor vicinity timing and the position of the vehicle at the deterioration timing is smaller than a second-floor/deterioration point distance threshold.

In the information processing apparatus, the information processing section may set the improvement timing as the entrance timing when a separation distance between the position of the vehicle at the deterioration timing and the position of the vehicle at the improvement timing is smaller than a deterioration/improvement point distance threshold.

The information processing apparatus may be a portable terminal carried by an occupant riding on the vehicle or an in-vehicle device mounted on the vehicle.

In order to attain the object, the present invention provides an information processing system including: a server; and an information processing apparatus connected to the server via a network and configured to process information concerning a multi-level structure including a plurality of floor levels where a vehicle can be parked. The information processing apparatus includes: a GPS receiving section configured to receive a GPS signal; a GPS processing section configured to detect GPS accuracy at an interval and detect the position of the vehicle on the basis of the GPS signal received by the GPS receiving section; an altitude detecting section configured to detect the altitude of the vehicle at an interval corresponding to the interval at which the GPS processing section detects the GPS accuracy; and an information processing section configured to detect entrance timing, which is timing when the GPS accuracy is detected when the vehicle is located at an entrance point of the multi-level structure, on the basis of transition of the GPS accuracy detected by the GPS processing section at the interval, detect an altitude difference between the altitude of the vehicle detected by the altitude detecting section at the entrance timing and the altitude of the vehicle detected by the altitude detecting section at parking timing, which is timing when the GPS accuracy is detected when the vehicle is located at a parking point in the multi-level structure, and transmit altitude difference information indicating the detected altitude difference to the server. The server includes a server control section configured to receive the altitude difference information and execute processing based on the received altitude difference information.

In the information processing system, the information processing section of the information processing apparatus may acquire the floor level where the vehicle is parked input from a user and transmit parking floor level information indicating the acquired floor level and entrance position information indicating the position of the vehicle at the entrance timing to the server together with the altitude difference information. The server may further include a server storing section configured to store information. The server control section of the server may receive the parking floor level information, the entrance position information, and the altitude difference information and cause the server storing section to store the entrance position information and the altitude difference information in association with the floor level indicated by the received parking floor level information.

In the information processing system, the information processing section of the information processing apparatus may transmit, to the server, floor level response request information including the altitude difference information and the entrance position information and inquiring about the floor level of the multi-level structure where the vehicle is parked. When receiving the floor level response request information, the server control section of the server may discriminate, on the basis of the entrance position information and the altitude difference information stored in association with the floor level, the floor level of the multi-level structure where the vehicle is parked and transmit floor level response information indicating the discriminated floor level to the information processing apparatus.

In the information processing system, the information processing apparatus may be communicably connected to a wearable terminal or an in-vehicle device mounted on the vehicle. When receiving the floor level response information, the information processing apparatus may communicate with the wearable terminal or the in-vehicle device and cause the wearable terminal or the in-vehicle device to display the floor level indicated by the floor level response information.

According to the present invention, it is possible to appropriately detect timing when a vehicle is located at an entrance of a multi-level structure.

BRIEF DESCRIPTION OF THE DRAWINGS

FIG. 4 is a diagram showing a flowchart for explaining the operation of an in-vehicle device and a flowchart for explaining the operation of a portable terminal;

FIG. 5 is a diagram showing a flowchart for explaining the operation of the in-vehicle device, a flowchart for explaining the operation of the portable terminal and a flowchart for explaining the operation of a wearable terminal;

FIG. 10 is a diagram showing a flowchart for explaining the operation of the wearable terminal, a flowchart for explaining the operation of the portable terminal and a flowchart for explaining the operation of the service providing server.

DETAILED DESCRIPTION OF THE PREFERRED EMBODIMENTS

An embodiment of the present invention is explained below with reference to the drawings.

Figure 1:
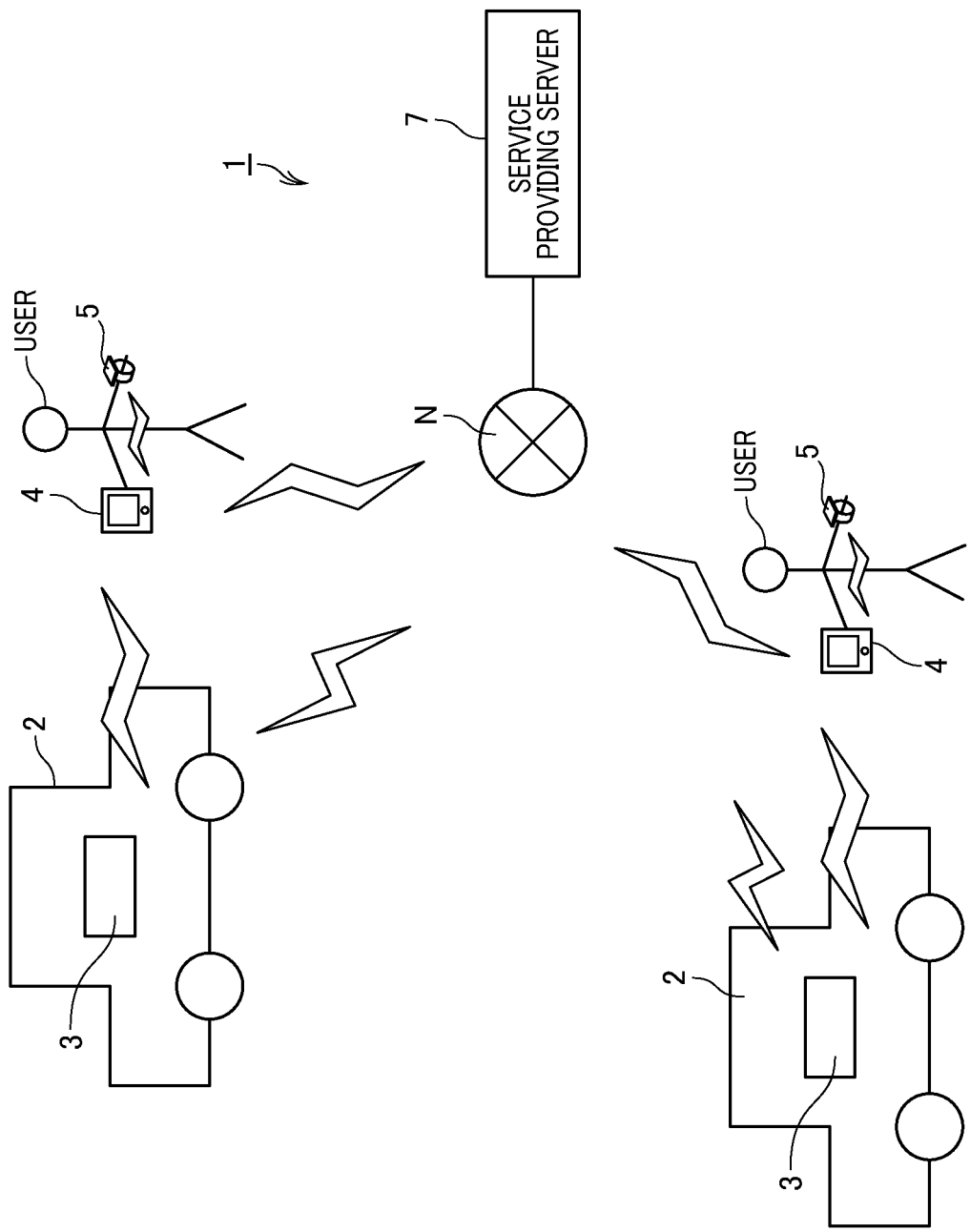
FIG. 1 is a diagram showing an information processing system according to an embodiment.

FIG. 1 is a diagram showing an information processing system 1 according to this embodiment.

As shown in FIG. 1, the information processing system 1 includes an in-vehicle device 3 mounted on a vehicle 2, a portable terminal 4 (an information processing apparatus) carried by a user (explained below) related to the vehicle 2, and a wearable terminal 5 worn by the user.

In this embodiment, for convenience of explanation, a person riding on the vehicle 2 such as a driver and a person getting off the vehicle 2 after riding on the vehicle 2 are collectively referred to as "user". An occupant is a concept included in the user.

The in-vehicle device 3 is an apparatus mounted on the vehicle 2. In this embodiment, the in-vehicle device 3 is a car navigation apparatus having a navigation function. The in-vehicle device 3 does not need to be the car navigation apparatus and only has to be an apparatus mountable on the vehicle 2.

The portable terminal 4 is an apparatus portable by the user. In this embodiment, the portable terminal 4 is a tablet-type cellular phone (a smart phone). The portable terminal 4 does not need to be the tablet-type cellular phone and only has to be an apparatus portable by the user such as a cellular phone of a type other than the tablet type, a tablet-type computer, or a notebook personal computer.

The wearable terminal 5 is an apparatus wearable on the user. In this embodiment, the wearable terminal 5 is a wristwatch-type apparatus. The wearable terminal 5 does not need to be the wristwatch-type apparatus and only has to be an apparatus wearable by the user such as an eyeglass-type head mounted display.

The in-vehicle device 3 and the portable terminal 4 are capable of performing radio communication according to a predetermined communication protocol such as Bluetooth (registered trademark). A communication protocol of communication performed between the apparatuses may be any communication protocol. The communication performed between the apparatuses may be wire communication.

The portable terminal 4 and the wearable terminal 5 are capable of performing radio communication according to the predetermined communication protocol such as Bluetooth. A communication protocol of communication performed between the apparatuses may be any communication protocol. The communication performed between the apparatuses may be wire communication.

As shown in FIG. 1, the information processing system 1 includes a service providing server 7.

The service providing server 7 is a server connected to a network N including the Internet, a telephone line, and other communication networks. The service providing server 7 is capable of communicating with the portable terminal 4 via the network N. The service providing server 7 is capable of communicating with the in-vehicle device 3 via the network N.

The service providing server 7 functions as a cloud server, clients of which are the portable terminal 4 and the in-vehicle device 3, in a relation with the portable terminal 4 and the in-vehicle device 3.

In FIG. 1, the service providing server 7 is represented by one block. However, this does not mean that the service providing server 7 is configured by a single server apparatus. The service providing server 7 may include a plurality of server apparatuses or may be a part of a system such as a host-type system or a distributed system.

Note that, although not explained in detail, secure communication is performed between the service providing server 7 and the portable terminal 4 according to a predetermined encryption technology and other technologies concerning security.

Figure 2:
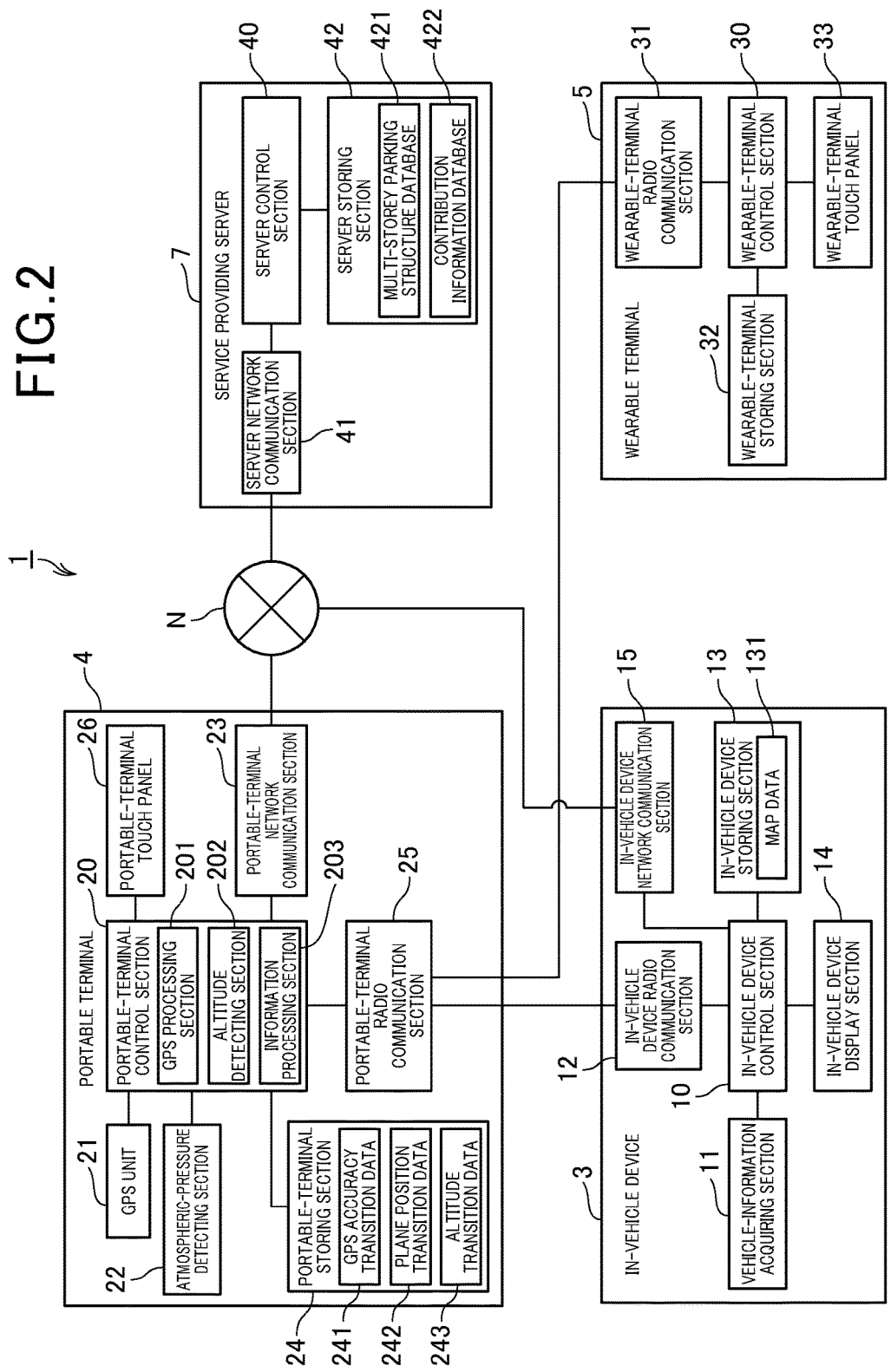
FIG. 2 is a block diagram showing the functional configurations of apparatuses included in the information processing system.

FIG. 2 is a block diagram showing the functional configurations of the in-vehicle device 3, the portable terminal 4, the wearable terminal 5, and the service providing server 7 included in the information processing system 1.

The in-vehicle device 3 is an apparatus mounted on the vehicle 2. The in-vehicle device 3 has at least a function of displaying a map and displaying the present position of the vehicle 2 on the map and a function of displaying a map, displaying a route to a destination on the map, and guiding the route to the destination.

As shown in FIG. 2, the in-vehicle device 3 includes an in-vehicle device control section 10, a vehicle-information acquiring section 11, an in-vehicle device radio communication section 12, an in-vehicle device storing section 13, an in-vehicle device display section 14, and an in-vehicle device network communication section 15.

The in-vehicle device control section 10 includes a CPU, a ROM, a RAM, and other peripheral circuits and controls the sections of the in-vehicle device 3.

The vehicle-information acquiring section 11 acquires information concerning the vehicle 2 and outputs the information to the in-vehicle device control section 10. Specifically, the vehicle-information acquiring section 11 includes a not-shown GPS unit and outputs, with a function of the GPS unit, information indicating the position and the traveling direction of the vehicle 2 to the in-vehicle device control section 10. The vehicle-information acquiring section 11 includes a gyro sensor and an acceleration sensor and outputs information indicating the relative orientation of the vehicle 2 and the acceleration of the vehicle 2 to the in-vehicle device control section 10 on the basis of detection values of the sensors. The vehicle-information acquiring section 11 includes a not-shown vehicle speed sensor and outputs information indicating the speed of the vehicle 2 to the in-vehicle device control section 10 on the basis of a detection value of the sensor. The vehicle-information acquiring section 11 includes a not-shown gear sensor and outputs information indicating a state of a gear of the vehicle 2 (parking (P), reverse (R), neutral (N), drive (D), etc.) to the in-vehicle device control section 10 on the basis of a detection value of the sensor. The vehicle-information acquiring section 11 includes a not-shown parking brake sensor and outputs information indicating an ON/OFF state of a brake by the parking brake to the in-vehicle device control section 10 on the basis of a detection value of the sensor.

The in-vehicle device radio communication section 12 establishes a radio communication link with the portable terminal 4 and communicates with the portable terminal 4 by radio under the control by the in-vehicle device control section 10 according to the predetermined communication protocol.

The in-vehicle device storing section 13 includes a non-volatile memory and stores various kinds of information. The in-vehicle device storing section 13 stores map data 131. The map data 131 is data including information necessary for displaying a map such as information concerning the map, information concerning facilities present on the map, information concerning links indicating roads on the map, and information concerning nodes indicating connecting portions of the links and information necessary for guidance of a route to a destination.

The in-vehicle device display section 14 includes a display panel such as a liquid crystal display panel and displays various kinds of information on the display panel under the control by the in-vehicle device control section 10.

The in-vehicle device network communication section 15 communicates with apparatuses (including the service providing server 7) connected to the network N under the control by the in-vehicle device control section 10 according to the predetermined communication protocol.

When being instructed to display the present position of the vehicle 2 on the map, the in-vehicle device control section 10 estimates the present position of the vehicle 2 on the basis of the information indicating the position, the traveling direction, the relative orientation, and the acceleration of the vehicle 2 input from the vehicle-information acquiring section 11. The in-vehicle device control section 10 displays a map centering on the estimated present position of the vehicle 2 on the display panel and displays an image indicating the present position of the vehicle 2 on the map on the basis of the map data 131.

When being instructed to guide a route to a destination, the in-vehicle device control section 10 estimates the present position of the vehicle 2, calculates the route to the destination on the basis of the map data 131, and displays the route to the destination and guides the route while displaying the present position of the vehicle 2 on the map.

The in-vehicle device control section 10 detects a state of traveling of the vehicle 2 on the basis of the information indicating the speed of the vehicle 2 input from the vehicle-information acquiring section 11, the information indicating the state of the gear, and the information indicating the ON/OFF state of the parking brake.

In particular, the in-vehicle device control section 10 detects parking of the vehicle 2 as the state of the traveling of the vehicle 2. In this embodiment, the "parking" means that the user completely stops the vehicle 2 for the purpose of getting off the vehicle 2 rather than temporarily stopping the vehicle 2. In the following explanation, the "parking" and the "stopping" are expressed to be distinguished. The in-vehicle device control section 10 discriminates that the vehicle 2 is parked in the case of "the vehicle speed of the vehicle 2=0 km per hour, the gear is the parking (P), and the parking brake is in the ON state".

The portable terminal 4 is a tablet-type cellular phone carried by the user.

As shown in FIG. 2, the portable terminal 4 includes a portable-terminal control section 20, a GPS unit 21 (a GPS receiving section), an atmospheric-pressure detecting section 22, a portable-terminal network communication section 23, a portable-terminal storing section 24, a portable-terminal radio communication section 25, and a portable-terminal touch panel 26.

The portable-terminal control section 20 includes a CPU, a ROM, a RAM, and other peripheral circuits and controls the sections of the portable terminal 4. The portable-terminal control section 20 includes a GPS processing section 201, an altitude detecting section 202, and an information processing section 203 as functional blocks. The functional blocks execute processing according to cooperation of hardware and software. For example, the CPU reads out and executes computer programs corresponding to the functional blocks. The functional blocks are explained below in detail.

The GPS unit 21 receives a GPS signal superimposed with a GPS radio wave from a GPS satellite via a not-shown GPS antenna and outputs, on the basis of the GPS signal, information indicating a plane position of the portable terminal 4 to the portable-terminal control section 20. Note that, in this embodiment, the "plane position" means a target position represented by a coordinate indicated by the latitude and the longitude and does not include a concept of "altitude" explained below. The GPS unit 21 detects GPS accuracy on the basis of information indicating reception intensity of the GPS signal and other information necessary for detecting GPS accuracy and outputs information indicating the detected GPS accuracy to the portable-terminal control section 20.

The atmospheric-pressure detecting section 22 includes an atmospheric pressure sensor and detects atmospheric pressure on the basis of a detection value of the atmospheric pressure sensor and outputs information indicating the detected atmospheric pressure to the portable-terminal control section 20.

The portable-terminal network communication section 23 communicates with the apparatuses (including the service providing server 7) connected to the network N under the control by the portable-terminal control section 20 according to the predetermined communication protocol.

The portable-terminal storing section 24 includes a nonvolatile memory and stores various kinds of information.

The portable-terminal radio communication section 25 establishes a radio communication link with the in-vehicle device 3 and communicates with the in-vehicle device 3 by radio under the control by the portable-terminal control section 20 according to the predetermined communication protocol.

The portable-terminal radio communication section 25 establishes a radio communication link with the wearable terminal 5 and communicates with the wearable terminal 5 by radio under the control by the portable-terminal control section 20 according to the predetermined communication protocol.

The portable-terminal touch panel 26 is a touch panel. The portable-terminal touch panel 26 displays various kinds of information under the control by the portable-terminal control section 20. The portable-terminal touch panel 26 detects touch operation and outputs information indicating the detected touch operation to the portable-terminal control section 20.

The wearable terminal 5 is a wristwatch-type apparatus wearable on the user.

As shown in FIG. 2, the wearable terminal 5 includes a wearable-terminal control section 30, a wearable-terminal radio communication section 31, a wearable-terminal storing section 32, and a wearable-terminal touch panel 33.

The wearable-terminal control section 30 includes a CPU, a ROM, a RAM, and other peripheral circuits and controls the sections of the wearable terminal 5.

The wearable-terminal radio communication section 31 establishes a radio communication link with the portable terminal 4 and communicates with the portable terminal 4 by radio under the control by the wearable-terminal control section 30 according to the predetermined communication protocol.

The wearable-terminal storing section 32 includes a nonvolatile memory and stores various kinds of information.

The wearable-terminal touch panel 33 is a touch panel. The wearable-terminal touch panel 33 displays various kinds of information under the control by the wearable-terminal control section 30. The wearable-terminal touch panel 33 detects touch operation and outputs information indicating the detected touch operation to the wearable-terminal control section 30.

The service providing server 7 is a server apparatus. The service providing server 7 functions as a cloud server, a client of which is the portable terminal 4, in a relation with the portable terminal 4.

As shown in FIG. 2, the service providing server 7 includes a server control section 40, a server network communication section 41, and a server storing section 42.

The server control section 40 includes a CPU, a ROM, a RAM, and other peripheral circuits and controls the sections of the service providing server 7.

The server network communication section 41 communicates with an apparatus (the portable terminal 4) connected to the network N under the control by the server control section 40 according to the predetermined communication protocol.

The server storing section 42 includes a nonvolatile memory and stores various kinds of information.

The GPS processing section 201 and the altitude detecting section 202 included in the portable terminal 4 are explained in detail.

Note that the GPS processing section 201 and the altitude detecting section 202 explained below and the information processing section 203 explained further blow execute processing on the basis of a dedicated application (including a computer program incidental to a dedicated application such as an API provided by an OS) installed in the portable terminal 4.

GPS Processing Section 201

As explained above, the GPS unit 21 outputs the information indicating the GPS accuracy to the portable-terminal control section 20 on the basis of the GPS signal. The GPS processing section 201 detects the GPS accuracy at an interval of a cycle S1 (e.g., 1 second) on the basis of the input from the GPS unit 21. The GPS processing section 201 updates, on the basis of the detected GPS accuracy, GPS accuracy transition data 241 stored in the portable-terminal storing section 24. The GPS accuracy transition data 241 is data having information indicating the GPS accuracy detected at the cycle S1 in a predetermined period (e.g., one hour) tracking back from the present point.

As explained above, the GPS unit 21 outputs the information indicating the plane position of the portable terminal 4 to the portable-terminal control section 20 on the basis of the GPS signal. The GPS processing section 201 detects the plane position of the portable terminal 4 at the interval of the cycle S1 (a cycle same as the cycle for detecting the GPS accuracy) on the basis of the input from the GPS unit 21. The GPS processing section 201 updates, on the basis of the detected plane position, plane position transition data 242 stored in the portable-terminal storing section 24. The plane position transition data 242 is data having information indicating a plane position detected at the cycle S1 in a predetermined time (e.g., one hour) tracking back from the present point.

When the user carrying the portable terminal 4 is riding on the vehicle 2, the position of the portable terminal 4 can be regarded as the position of the vehicle 2. Therefore, when the user carrying the portable terminal 4 is riding on the vehicle 2, the GPS processing section 201 detects the plane position (the position) of the vehicle 2 on the basis of the GPS signal received by the GPS unit 21 (the GPS receiving section). Concerning a period in which the user carrying the portable terminal 4 is riding on the vehicle 2, the plane position transition data 242 has information indicating a plane position of the vehicle 2 detected at the cycle S1 in a predetermined period tracking back from the present point.

Altitude Detecting Section 202

As explained above, the atmospheric-pressure detecting section 22 outputs the information indicating the atmospheric pressure to the portable-terminal control section 20. The altitude detecting section 202 detects the altitude of the portable terminal 4 at the interval of the cycle S1 (a cycle same as the cycle at which the GPS processing section 201 detects the GPS accuracy) on the basis of the input from the atmospheric-pressure detecting section 22. The altitude detecting section 202 updates, on the basis of the detected altitude of the portable terminal 4, altitude transition data 243 stored in the portable-terminal storing section 24. The altitude transition data 243 is data having information indicating altitude detected at the cycle S1 in a predetermined period (e.g., one hour) tracking back from the present point.

When the user carrying the portable terminal 4 is riding on the vehicle 2, the altitude of the portable terminal 4 can be regarded as the altitude of the vehicle 2. Therefore, when the user carrying the portable terminal 4 is riding on the vehicle 2, the altitude detecting section 202 detects the altitude of the vehicle 2 on the basis of a GPS signal received by the GPS unit 21 (the GPS receiving section). Concerning a period in which the user carrying the portable terminal 4 is riding on the vehicle 2, the altitude transition data 243 has information indicating the altitude of the vehicle 2 detected at the cycle S1 in a predetermined period tracking back from the present point.

The GPS processing section 201 and the altitude detecting section 202 are explained above. In this embodiment, the cycle at which the GPS processing section 201 detects the GPS accuracy and the GPS processing section 201 detects the plane position and the cycle at which the altitude detecting section 202 detects the altitude are the same cycle S1. However, the cycles do not need to be the same. In the cycles, a correspondence relation among timings for detecting corresponding targets only has to be understood.

Incidentally, the vehicle 2 is sometimes parked in a multi-storey parking structure. The multi-storey parking structure is a multi-level structure including a plurality of floor levels where the vehicle 2 can be parked.

When the vehicle 2 is parked in the multi-storey parking structure, usually, the vehicle 2 is parked through a route explained below. The vehicle 2 enters the inside of the multi-storey parking structure via an entrance provided in the multi-storey parking structure (when a plurality of entrances are provided in the multi-storey parking structure, any one of the entrances). Subsequently, on the inside of the multi-storey parking structure, the vehicle 2 travels on slopes provided among the floor levels according to necessity and reaches a predetermined floor level where the user desires to park the vehicle 2. Subsequently, the vehicle 2 is parked in a predetermined position in the desired floor level.

In the following explanation, the position of the entrance of the multi-storey parking structure is referred to as "entrance point". The entrance point only has to indicate a point included in a predetermined range corresponding to the position of the entrance of the multi-storey parking structure. The position where the vehicle 2 is parked in the multi-storey parking structure is referred to as "parking point". The parking point only has to indicate a point included in a predetermined range corresponding to the position where the vehicle 2 is parked in the multi-storey parking structure. In the following explanation, a route from the entering of the vehicle 2 into the multi-storey parking structure via the entrance point to the parking at the parking point in the multi-storey parking structure is referred to as "parking route".

The inventor found as a result of tests and simulations that, when the vehicle 2 travels on the parking route, GPS accuracy transitions in a characteristic form explained below.

Note that, in the following explanation, when the multi-storey parking structure is represented by a specific floor level such as "second floor of the multi-storey parking structure", the floor level means a floor of the floor level. The floor means a region where the vehicle 2 can travel. Therefore, the "second floor of the multi-storey parking structure" means a floor of the second floor of the multi-storey parking structure. The "altitude of the second floor of the multi-storey parking structure" means the altitude of the floor of the second floor of the multi-storey parking structure.

Figure 3A:
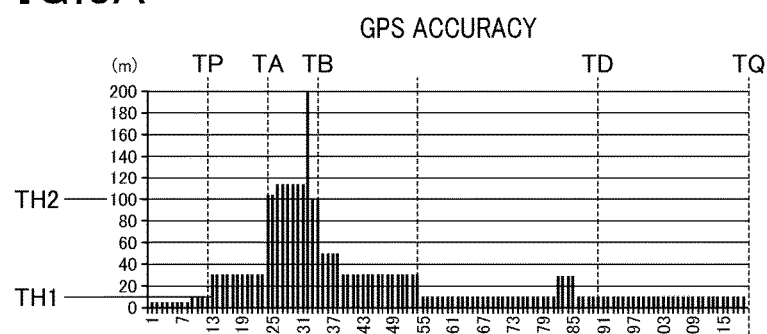
FIG. 3A is a diagram showing transition of GPS accuracy.

FIG. 3A is a graph showing transition of GPS accuracy detected at the cycle S1 when the vehicle 2 travels on a route including the parking route and is parked on a third floor of the multi-storey parking structure. In the graph of FIG. 3A, the abscissa indicates a sampling cycle (timing) at which the GPS processing section 201 detects GPS accuracy. In the graph of FIG. 3A, the ordinate indicates the GPS accuracy (a unit is m (meter)). On the ordinate of the graph of FIG. 3A, a reference value is GPS accuracy: 0 m. An upper part of the figure further deviates from the reference value and indicates deterioration of the GPS accuracy.

Figure 3B:
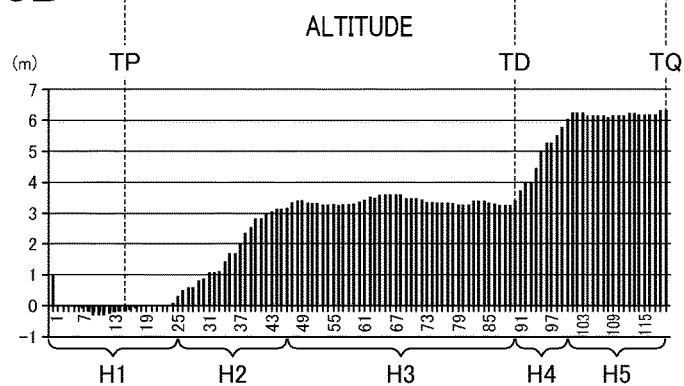
FIG. 3B is a diagram showing transition of altitude.

FIG. 3B is a graph showing transition of the altitude of the vehicle 2 detected at the cycle S1 when the vehicle 2 travels on the route related to FIG. 3A. The abscissa of FIG. 3B indicates the elapse of time. In the graph of FIG. 3B, a scale on the abscissa indicates timing when the altitude detecting section 202 detects the altitude of the vehicle 2. The timing corresponding to a scale on the abscissa of the graph of FIG. 3A and the timing corresponding to the scale on the abscissa of the graph of FIG. 3B are synchronized. In the graph of FIG. 3B, the ordinate indicates the altitude (a unit is m (meter)) of the vehicle 2. On the ordinate of the graph of FIG. 3B, a reference value is altitude: 0 m. An upper part of the figure further deviates from the reference value and indicates an increase in the altitude of the vehicle 2.

In the graphs of FIGS. 3A and 3B, timing TP is timing when the vehicle 2 is located at the entrance point. In the graphs of FIGS. 3A and 3B, timing TQ is timing when the vehicle 2 is located at the parking point.

In the graphs of FIGS. 3A and 3B, a range H1 is a range in which the altitude of the vehicle 2 transitions at a value substantially the same as the altitude of the entrance point and is a range corresponding to a period in which the vehicle 2 is traveling on the first floor of the multi-storey parking structure. In the graphs of FIGS. 3A and 3B, a range H2 is a range in which the altitude of the vehicle 2 gradually increases from the altitude of the entrance point and is a range corresponding to a period in which the vehicle 2 is traveling on a slope connecting the first floor and the second floor of the multi-storey parking structure. In the graphs of FIGS. 3A and 3B, a range H3 is a range in which the altitude of the vehicle 2 is stable at predetermined altitude higher than the altitude of the entrance point. The altitude of the vehicle 2 in the range H3 can be estimated as the altitude of the second floor of the multi-storey parking structure. Therefore, the range H3 is a range corresponding to a period in which the vehicle 2 is traveling on the second floor of the multi-storey parking structure. In the graphs of FIGS. 3A and 3B, a range H4 is a range in which the altitude of the vehicle 2 gradually increases from the altitude of the second floor of the multi-storey parking structure and is a range corresponding to a period in which the vehicle 2 is traveling on a slope connecting the second floor and the third floor of the multi-storey parking structure. In the graphs of FIGS. 3A and 3B, a range H5 is a range in which the altitude of the vehicle 2 is stable at predetermined altitude higher than the altitude of the second floor of the multi-storey parking structure. The altitude of the vehicle 2 in the range H5 can be estimated as the altitude of the third floor of the multi-storey parking structure. Therefore, the range H5 is a range corresponding to a period in which the vehicle 2 is traveling on the third floor of the multi-storey parking structure.

As shown in the graph of FIG. 3A, the GPS accuracy stably transitions at high accuracy near the GPS accuracy: 0 m until the timing TP.

As shown in the graph of FIG. 3A, when the vehicle 2 is located at the entrance point according to the entrance of the vehicle 2 into the multi-storey parking structure, at the timing TP, the GPS accuracy deteriorates to exceed improvement determination accuracy threshold TH1 (in this example, GPS accuracy: 10 m), which is a threshold decided in advance. The GPS accuracy gradually deteriorates even after the elapse of the timing TP. At timing TA, the GPS accuracy deteriorates to exceed deterioration determination accuracy threshold TH2 (in this example, GPS accuracy: 100 m), which is a threshold decided in advance. The GPS accuracy reaches a peak of the deterioration at predetermined timing after the elapse of the timing TA. After reaching the peak of the deterioration at the predetermined timing, the GPS accuracy gradually improves. At timing TB, the GPS accuracy improves to be lower than the deterioration determination accuracy threshold TH2. The GPS accuracy gradually improves even after the elapse of the timing TB. At timing TC, the improvement stops. After the elapse of the timing TC, up to timing TQ, the GPS accuracy stably transitions in a state in which high accuracy is maintained.

Note that it has been found through prior tests and simulations that timing when the GPS accuracy reaches the peak of the deterioration occurs while the vehicle 2 is traveling on the slope connecting the first floor and the second floor of the multi-storey parking structure.

In the following explanation, the timing when the vehicle 2 is located at the entrance point (the timing TP in FIGS. 3A and 3B) is referred to as "entrance timing". The timing when the vehicle 2 is located at the parking point (the timing TQ in FIGS. 3A and 3B) is referred to as "parking timing".

When the vehicle 2 travels on the parking route as explained above, the GPS accuracy transitions in a characteristic form explained below. After exceeding the improvement determination accuracy threshold TH1 at the entrance timing (the timing TP in FIGS. 3A and 3B) when the vehicle 2 is located at the entrance point, the GPS accuracy gradually deteriorates. After deteriorating to exceed the improvement determination accuracy threshold TH1, the GPS accuracy further deteriorates to exceed the deterioration determination accuracy threshold and reaches the peak of the deterioration. After reaching the peak of the deterioration, the GPS accuracy gradually improves to be smaller than the deterioration determination accuracy threshold. After improving to be smaller than the deterioration determination accuracy threshold, the GPS accuracy further gradually improves. The improvement stops at predetermined timing. Thereafter, up to the parking timing (the timing TQ in FIGS. 3A and 3B), the GPS accuracy stably transitions in a state in which the high accuracy is maintained.

When the vehicle 2 travels on the parking route, the GPS accuracy transitions as explained above because of a reason explained below. Before the vehicle 2 enters the multi-storey parking structure, reception of a GPS radio wave (a GPS signal) by the GPS unit 21 is not affected by the walls and the floors of the multi-storey parking structure and other structures related to the multi-storey parking structure. The GPS accuracy stably transitions at the high accuracy.

On the other hand, when the vehicle 2 enters the multi-storey parking structure, the structures related to the multi-storey parking structure become obstacles and affect the reception of the GPS radio wave (the GPS signal) by the GPS unit 21. The GPS unit 21 has a characteristic that, when reception intensity suddenly fluctuates in a short time, the GPS accuracy related to the GPS radio wave received by the GPS unit 21 continuously deteriorates until the reception intensity stabilizes from the sudden fluctuation. The multi-storey parking structure has a characteristic that, near the entrance, there are a relatively large number of structures that could be obstacles of the reception of the GPS radio wave such as structures for managing parking in the multi-storey parking structure and structures for regulating entrance into and exit from the multi-storey parking structure. Near the entrance of the multi-storey parking structure, the vehicle 2 needs to travel according to traveling of other vehicles 2 that enter or exit the multi-storey parking structure. Therefore, the traveling of the vehicle 2 after the entrance into the multi-storey parking structure has a characteristic that the traveling of the vehicle 2 does not stabilize for a while after the vehicle 2 enters the multi-storey parking structure.

Because of the reason deriving from the characteristic of the GPS unit 21, the reason deriving from the structural characteristic concerning the multi-storey parking structure, and the reason deriving from the characteristic concerning the traveling of the vehicle 2 after the entrance into the multi-storey parking structure explained above and other reasons, the GPS accuracy continuously deteriorates and reaches the peak of the deterioration in a predetermined period after the vehicle 2 enters the multi-storey parking structure. After reaching the peak of the deterioration, the GPS accuracy gradually improves according to stabilization of the fluctuation in the reception intensity in the GPS unit 21, a decrease of the obstacles of the GPS radio wave in the multi-storey parking structure, and stabilization of the traveling of the vehicle 2 in the multi-storey parking structure. The improvement stops at a certain level. The GPS accuracy stably transitions at the high accuracy.

In this embodiment, the information processing section 203 of the portable terminal 4 can perform, on the basis of the transition of the GPS accuracy in the case of traveling of the vehicle 2 on the parking route, first entrance timing detection processing or second entrance timing detection processing explained below and detect the entrance timing.

The first entrance timing detection processing and the second entrance timing detection processing are explained below in order.

First Entrance Timing Detection Processing

FIG. 4 is a diagram showing flowcharts for explaining the operations of the in-vehicle device 3 and the portable terminal 4 at the time when the information processing section 203 executes the first entrance timing detection processing. A flowchart A of FIG. 4 shows the operation of the in-vehicle device 3. A flowchart B of FIG. 4 shows the operation of the portable terminal 4 (the first entrance timing detection processing).

Note that, as it is evident from the following explanation, in the first entrance timing detection processing, the portable terminal 4 detects the entrance timing after detecting that the vehicle 2 is parked in the multi-storey parking structure.

In FIG. 4, for convenience of explanation, it is assumed that a trigger for execution of the first entrance timing detection processing by the information processing section 203 is reception of predetermined information from the in-vehicle device 3. However, the trigger for the information processing section 203 to execute the first entrance timing detection processing is not limited to the trigger illustrated in FIG. 4.

Dedicated software corresponding to a dedicated application installed in the portable terminal 4 is installed in the in-vehicle device 3. The dedicated software related to the in-vehicle device 3 has a function of establishing a logical communication route between the dedicated software and the dedicated application related to the portable terminal 4 and establishing a state in which transmission and reception can be asynchronously performed between these computer programs. At start points of the flowcharts of FIG. 4, the dedicated application of the portable terminal 4 is started, the dedicated software of the in-vehicle device 3 is started, and the communication route is established between the computer programs.

The in-vehicle device 3 executes the processing shown in the flowchart A of FIG. 4 with the functions of the dedicated software installed in the in-vehicle device 3 and a computer program incidental to the dedicated software.

As shown in the flowchart A of FIG. 4, the in-vehicle device control section 10 of the in-vehicle device 3 monitors on the basis of an input from the vehicle-information acquiring section 11 whether the vehicle 2 is parked (step SA1). As explained above, in the case of "the vehicle speed of the vehicle 2=0 km per hour, the gear is the parking (P), and the parking brake is in the ON state", the in-vehicle device control section 10 discriminates that the vehicle 2 is parked.

If the vehicle 2 is parked (YES in step SA1), the in-vehicle device control section 10 transmits information indicating that the vehicle 2 is parked to the portable terminal 4 (step SA2).

The information processing section 203 of the portable terminal 4 receives the information indicating that the vehicle 2 is parked (step SB1).

Subsequently, the information processing section 203 refers to the GPS accuracy transition data 241 and detects the parking timing (in the example shown in FIGS. 3A and 3B, the timing TQ) among timings when the GPS accuracy is detected (step SB2).

Subsequently, the information processing section 203 detects, referring to the GPS accuracy transition data 241, the deterioration timing (in the example shown in FIGS. 3A and 3B, the timing TB), which is timing when the GPS accuracy deteriorates to exceed the deterioration determination accuracy threshold first, tracking back from the parking timing (step SB3).

Subsequently, the information processing section 203 detects, referring to the plane position transition data 242, a separation distance between the plane position of the vehicle 2 at the parking timing and the plane position of the vehicle 2 at the deterioration timing (step SB4). Specifically, in step SB4, the information processing section 203 acquires, referring to the plane position transition data 242, the plane position of the vehicle 2 detected by the GPS processing section 201 at the parking timing. Subsequently, the information processing section 203 acquires, referring to the plane position transition data 242, the plane position of the vehicle 2 detected by the GPS processing section 201 at the deterioration timing. Subsequently, the information processing section 203 detects, on the basis of the acquired plane position of the vehicle 2 detected by the GPS processing section 201 at the parking timing and the acquired plane position of the vehicle 2 detected by the GPS processing section 201 at the deterioration timing, the separation distance between the plane positions according to the Pythagorean theory.

In the following explanation, the separation distance between the plane position of the vehicle 2 at the parking timing and the plane position of the vehicle 2 at the deterioration timing is referred to as "parking/deterioration point separation distance".

Subsequently, the information processing section 203 discriminates whether the detected parking/deterioration point separation distance is smaller than a parking/deterioration point distance threshold, which is a threshold decided in advance (step SB5).

If the parking/deterioration point separation distance is not smaller than the parking/deterioration point distance threshold (NO in step SB5), the information processing section 203 stops the processing without detecting the entrance timing (step SB6).

The processing in step SB6 is executed because of a reason explained below. When the vehicle 2 travels on the parking route and is parked in the multi-storey parking structure, both of the plane position of the vehicle 2 at the parking timing and the plane position of the vehicle 2 at the deterioration timing are present within the region of the multi-storey parking structure. Therefore, the parking/deterioration point separation distance at the time when the vehicle 2 travels on the parking route and is parked in the multi-storey parking structure does not exceed a predetermined distance that reflects the size of the region of the multi-storey parking structure. Taking the above into account, the parking/deterioration point distance threshold is decided beforehand reflecting an assumed size of the region of the multi-storey parking structure. When the detected parking/deterioration point separation distance is not smaller than the parking/deterioration point distance threshold, the information processing section 203 does not perform the detection of the entrance timing assuming that it is likely that the vehicle 2 is not parked in the multi-storey parking structure.

If determining in step SB5 that the detected parking/deterioration point separation distance is smaller than the parking/deterioration point distance threshold (YES in step SB5), the information processing section 203 detects, referring to the GPS accuracy transition data 241, the improvement timing (in the example shown in FIGS. 3A and 3B, the timing TP), which is timing when the GPS accuracy improves to be smaller than the improvement determination accuracy threshold TH1 first, tracking back from the deterioration timing (step SB7).

Subsequently, the information processing section 203 detects, referring to the plane position transition data 242, a separation distance between the plane position of the vehicle 2 at the deterioration timing and the plane position of the vehicle 2 at the improvement timing (hereinafter referred to as "deterioration/improvement point separation distance") (step SB8). The information processing section 203 performs the detection of the separation distance between the plane position of the vehicle 2 at the deterioration timing and the plane position of the vehicle 2 at the improvement timing with a method same as the method of detecting the separation distance between the plane position of the vehicle 2 at the parking timing and the plane position of the vehicle 2 at the deterioration timing.

Subsequently, the information processing section 203 discriminates whether the detected deterioration/improvement point separation distance is smaller than a deterioration/improvement point distance threshold decided in advance (step SB9).

If the deterioration/improvement point separation distance is not smaller than the deterioration/improvement point distance threshold (NO in step SB9), the information processing section 203 stops the processing without detecting the entrance timing (step SB10). The processing in step SB10 is performed because of a reason same as the reason for the processing in step SB6.

If the deterioration/improvement point separation distance is smaller than the deterioration/improvement point distance threshold (YES in step SB9), the information processing section 203 detects, referring to the altitude transition data 243, an altitude difference between the altitude of the vehicle 2 at the parking timing and the altitude of the vehicle 2 at the improvement timing (step SB11). Specifically, in step SB11, the information processing section 203 acquires, referring to the altitude transition data 243, the altitude of the vehicle 2 detected by the altitude detecting section 202 at the parking timing. Subsequently, the information processing section 203 acquires, referring to the altitude transition data 243, the altitude of the vehicle 2 detected by the altitude detecting section 202 at the improvement timing. Subsequently, the information processing section 203 detects an altitude difference by calculating, on the basis of the acquired altitude of the vehicle 2 detected by the altitude detecting section 202 at the parking timing and the acquired altitude of the vehicle 2 detected by the altitude detecting section 202 at the improvement timing, a difference between the altitudes.

Subsequently, the information processing section 203 discriminates whether the altitude difference detected in step SB11 exceeds an altitude threshold decided in advance (step SB12).

If the detected altitude difference does not exceed the altitude threshold (NO in step SB12), the information processing section 203 does not change a state concerning a multi-storey-parking-structure determination flag (explained below) stored in a predetermined storage region (step SB13). Thereafter, the information processing section 203 shifts the processing procedure to step SB15.

On the other hand, if the detected altitude difference exceeds the altitude threshold (YES in step SB12), the information processing section 203 turns on the multi-storey-parking-structure determination flag (step SB14). Thereafter, the information processing section 203 shifts the processing procedure to step SB15.

The processing in steps SB12 to SB14 is executed because of a reason explained below.

In the first entrance timing detection processing, an input of the user to the effect that the vehicle 2 is parked in the multi-storey parking structure is not performed. Therefore, it is necessary to determine whether the vehicle 2 is parked in the multi-storey parking structure. When the vehicle 2 travels on the parking route and is parked in a floor level equal to or higher than the second floor of the multi-storey parking structure, an altitude difference between the altitude of the vehicle 2 at the entrance timing and the altitude of the vehicle 2 at the parking timing is at least equal to or larger than the width in the height direction between the floor levels. Therefore, when the altitude difference between the altitude of the vehicle 2 at the entrance timing and the altitude of the vehicle 2 at the parking timing is equal to or larger than the width in the height direction between the floor levels, when it is taken into account that the processing in step SB5 and the processing in step SB9 are performed, it is possible to consider that the vehicle 2 is parked in the multi-storey parking structure at an extremely high probability. On the other hand, when the altitude difference between the altitude of the vehicle 2 at the entrance timing and the altitude of the vehicle 2 at the parking timing is not equal to or larger than the width in the height direction between the floor levels, it is likely that the vehicle 2 is parked on the first floor of the multi-storey parking structure. On the other hand, it is likely that the vehicle 2 is parked in a place other than the multi-storey parking structure.

Taking the above into account, an altitude threshold is decided beforehand reflecting the width in the height direction between the floor levels in the multi-storey parking structure. When the detected altitude difference exceeds the altitude threshold, the information processing section 203 turns on the multi-storey-parking-structure determination flag. On the other hand, when the detected altitude difference does not exceed the altitude threshold, the information processing section 203 does not change a state of the multi-storey-parking-structure determination flag. Consequently, by referring to the multi-storey-parking-structure determination flag, the information processing section 203 can appropriately manage the likelihood that the vehicle 2 is not parked in the multi-storey parking structure.

In step SB15, the information processing section 203 sets the improvement timing as the entrance timing.

By executing the first entrance timing detection processing shown in the flowchart B of FIG. 4 and detecting the entrance timing, the information processing section 203 can appropriately detect the entrance timing reflecting a characteristic of transition of the GPS accuracy at the time when the vehicle 2 travels on the parking route and is parked in the multi-storey parking structure.

In particular, according to the first entrance timing detection processing, the information processing section 203 can automatically detect the entrance timing without requiring work of the user at timing when the vehicle 2 is located at the entrance point of the multi-storey parking structure.

Second Entrance Timing Detection Processing

The second entrance timing detection processing is explained.

FIG. 5 is a diagram showing flowcharts for explaining the operations of the in-vehicle device 3, the portable terminal 4, and the wearable terminal 5 at the time when the information processing section 203 executes the second entrance timing detection processing. A flowchart A of FIG. 5 shows the operation of the in-vehicle device 3. A flowchart B of FIG. 5 shows the operation of the portable terminal 4 (the second entrance timing detection processing). A flowchart C of FIG. 5 shows the operation of the wearable terminal 5.

Note that, in FIG. 5, for convenience of explanation, it is assumed that a trigger for execution of the second entrance timing detection processing by the information processing section 203 is reception of predetermined information from the in-vehicle device 3. However, the trigger for the information processing section 203 to execute the second entrance timing detection processing is not limited to the trigger illustrated in FIG. 5.

In the wearable terminal 5, dedicated software corresponding to the dedicated application installed in the portable terminal 4 is installed. The dedicated software related to the wearable terminal 5 has a function of establishing a logical communication route between the dedicated software and the dedicated application related to the portable terminal 4 and establishing a state in which transmission and reception of the data can be asynchronously performed between the computer programs. At start points of the flowcharts of FIG. 5, the dedicated application of the portable terminal 4 is started, the dedicated software of the wearable terminal 5 is started, and the communication route is established between the computer programs. The wearable terminal 5 executes processing shown in the flowchart C of FIG. 5 with the functions of the dedicated software installed in the wearable terminal 5 and a computer program incidental to the dedicated software.

At the start points of the flowcharts of FIG. 5, the dedicated application of the portable terminal 4 is started, the dedicated software of the in-vehicle device 3 is started, and the communication route is established between the computer programs.

As shown in the flowchart A of FIG. 5, the in-vehicle device control section 10 of the in-vehicle device 3 monitors on the basis of an input from the vehicle-information acquiring section 11 whether the vehicle 2 is parked (step SC1).

If the vehicle 2 is parked (YES in step SC1), the in-vehicle device control section 10 transmits information indicating that the vehicle 2 is parked to the portable terminal 4 (step SC2).

As shown in the flowchart B of FIG. 5, the information processing section 203 of the portable terminal 4 receives the information indicating that the vehicle 2 is parked (step SD1).

Subsequently, the information processing section 203 transmits the information indicating that the vehicle 2 is parked to the wearable terminal 5 (step SD2).

As shown in the flowchart C of FIG. 5, the wearable-terminal control section 30 of the wearable terminal 5 receives the information indicating that the vehicle 2 is parked (step SE1).

Subsequently, the wearable-terminal control section 30 inquires whether the vehicle 2 is parked in the multi-storey parking structure. When the vehicle 2 is parked in the multi-storey parking structure, the wearable-terminal control section 30 causes the wearable-terminal touch panel 33 to display a user interface for inquiring about a floor level where the vehicle 2 is parked (step SE2).

Figure 6:
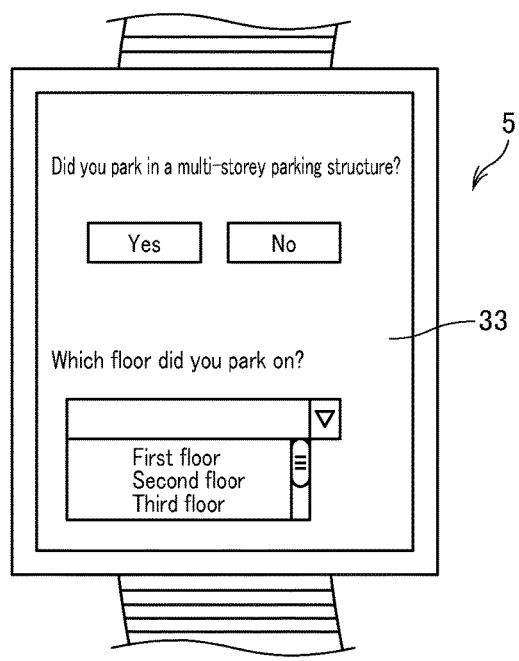
FIG. 6 is a diagram showing a user interface displayed on the wearable terminal.

FIG. 6 is a diagram showing an example of the user interface displayed on the wearable-terminal touch panel 33 according to the processing in step SE2.

In the user interface illustrated in FIG. 6, the user can selectively input whether the vehicle 2 is parked in the multi-storey parking structure. In the user interface illustrated in FIG. 6, the user can input a floor level where the vehicle 2 is parked by selecting an item indicating the floor level where the vehicle 2 is parked from a pull-down menu.

When the vehicle 2 is parked in the multi-storey parking structure, the user performs, in the user interface displayed on the wearable-terminal touch panel 33, an input indicating that the vehicle 2 is parked in the multi-storey parking structure and an input indicating the floor level where the vehicle 2 is parked (step SX1).

Note that, when the vehicle 2 is not parked in the multi-storey parking structure, the user performs, in the interface, an input indicating that the vehicle 2 is not parked in the multi-storey parking structure. The wearable terminal 5 transmits information indicating that the vehicle 2 is not parked in the multi-storey parking structure to the portable terminal 4. When receiving the information indicating that the vehicle 2 is not parked in the multi-storey parking structure, the portable terminal 4 stops the processing and does not perform the detection of the entrance timing.

When the input indicating that the vehicle 2 is parked in the multi-storey parking structure and the input indicating the floor level where the vehicle 2 is parked are performed in the user interface from the user in step SX1, the wearable-terminal control section 30 executes processing explained below. The wearable-terminal control section 30 transmits the information indicating the floor level where the vehicle 2 is parked input from the user (hereinafter referred to as "designated parking floor level information") to the portable terminal 4 (step SE3).

As shown in the flowchart B of FIG. 5, the information processing section 203 of the portable terminal 4 receives the designated parking floor level information (step SD3).

Subsequently, the information processing section 203 acquires, on the basis of the received designated parking floor level information, the floor level where the vehicle 2 is parked input from the user (step SD4).

Subsequently, the information processing section 203 detects, referring to the altitude transition data 243, the altitude of the vehicle 2 at the parking timing (step SD5).

Subsequently, the information processing section 203 detects second-floor vicinity timing on the basis of the altitude transition data 243 (step SD6).

The processing in step SD6 and the second-floor vicinity timing are explained below with reference to FIG. 3B.

The width in the height direction between the floor levels in the multi-storey parking structure has a characteristic that the width is not considerably different in each multi-storey parking structure. Specifically, concerning a large number of multi-storey parking structures, the width in the height direction between the floor levels is within a fixed range centering on "2.7 m". On the basis of this fact, "2.7 m" is decided beforehand as a reference value of the width in the height direction between the floor levels in the multi-storey parking structure. In the following explanation, the reference value of the width in the height direction between the floor levels in the multi-storey parking structure is referred to as "floor level width". Note that, in this embodiment, a value of the floor level width is "2.7 m". However, the value of the floor level width is not limited to the illustrated value.

Taking the above into account, in step SD6, the information processing section 203 detects, referring to the altitude transition data 243, the altitude of the vehicle 2 detected by the altitude detecting section 202 at the parking timing. Subsequently, the information processing section 203 estimates the altitude of the second floor according to the following Expression K1.

$$Z1=Z2-(Z3\times(Z4-2))  \quad \text{(Expression K1)}$$

Note that, in Expression K1, Z1 indicates the altitude of the second floor. Z2 indicates the altitude of the vehicle 2 at the parking timing. Z3 indicates the floor level width. Z4 indicates the floor level where the vehicle 2 is parked.

Note that a method of estimating the altitude of the second floor is not limited to the illustrated method and may be any method.

After estimating the altitude of the second floor, the information processing section 203 detects the second-floor vicinity timing as explained below. The information processing section 203 detects, on the basis of the altitude transition data 243, the second-floor vicinity timing, which is timing when altitude corresponding to the estimated altitude of the second floor (reflecting a fixed margin) is detected first, tracking back from the parking timing among timings when the altitude is detected by the altitude detecting section 202.

In FIG. 3B, timing TD is timing detected as the second-floor vicinity timing by the information processing section 203 according to the processing in step SD6.

As shown in the flowchart B of FIG. 5, after detecting the second-floor vicinity timing in step SD6, the information processing section 203 detects, referring to the GPS accuracy transition data 241, deterioration timing (in the example shown in FIGS. 3A and 3B, the timing TB), which is timing when the GPS accuracy deteriorates to exceed the deterioration determination accuracy threshold first, tracking back from the second-floor vicinity timing (step SD7).

As explained above, it has been found that, when the vehicle 2 travels on the parking route, the timing when the GPS accuracy reaches the peak of the deterioration occurs while the vehicle 2 is traveling on the slope connecting the first floor and the second floor of the multi-storey parking structure. That is, the deterioration timing occurs temporally before the second-floor vicinity timing.

In the first entrance timing detection processing explained above, the information processing section 203 detects the detection timing tracking back from the parking timing. On the other hand, in the second entrance timing detection processing, the information processing section 203 detects the deterioration timing tracking back from the second-floor vicinity timing after detecting the second-floor vicinity timing. Consequently, effects explained below are attained.

The parking timing could sometimes occur when a long time elapses after the deterioration timing. For example, when the multi-storey parking structure has ten floors and the vehicle 2 is parked on the tenth floor, a long time is required until the vehicle 2 is parked on the tenth floor after entering the multi-storey parking structure via the entrance. In this case, an elapsed time between the deterioration timing and the parking timing is long. As the elapsed time between the deterioration timing and the parking timing is longer, it is more likely that the GPS accuracy deteriorates to exceed the deterioration determination accuracy threshold because of noise and other reasons between the timings.

On the other hand, the second-floor vicinity timing is a state in which the vehicle 2 is located in the second floor. It is assumed that the elapsed time between the second-floor vicinity timing and the deterioration timing is short irrespective of how many floors the multi-storey parking structure has. Therefore, likelihood that the GPS accuracy accidentally deteriorates to exceed the deterioration determination accuracy threshold in an unexpected form between the second-floor vicinity timing and the deterioration timing is lower than the likelihood of the deterioration in the GPS accuracy between the parking timing and the deterioration timing. Taking the above into account, by detecting the deterioration timing tracking back from the second-floor vicinity timing, it is possible to appropriately detect the deterioration timing taking into account the characteristic of the transition of the GPS accuracy at the time when the vehicle 2 travels on the parking route.

After detecting the deterioration timing, the information processing section 203 detects, referring to the plane position transition data 242, a separation distance between the plane position of the vehicle 2 at the second-floor vicinity timing and the plane position of the vehicle 2 at the deterioration timing (step SD8).

In the following explanation, the separation distance between the plane position of the vehicle 2 at the second-floor vicinity timing and the plane position of the vehicle 2 at the deterioration timing is referred to as "second floor/deterioration point separation distance".

Subsequently, the information processing section 203 discriminates whether the detected second floor/deterioration point separation distance is smaller than a second floor/deterioration point distance threshold, which is a threshold decided in advance (step SD9).

If the second floor/deterioration point separation distance is not smaller than the second floor/deterioration point distance threshold (NO in step SD9), the information processing section 203 stops the processing without detecting the entrance timing (step SD10). The processing in step SD10 is executed because of a reason same as the reason for the processing in step SB6.

If discriminating in step SD9 that the detected second floor/deterioration point separation distance is smaller than the second floor/deterioration point distance threshold (YES in step SD9), the information processing section 203 detects, referring to the GPS accuracy transition data 241, improvement timing (in the example shown in FIGS. 3A and 3B, the timing TP), which is timing when the GPS accuracy improves to be smaller than the improvement determination accuracy threshold TH1 first, tracking back from the deterioration timing (step SD11).

Subsequently, the information processing section 203 detects the deterioration/improvement point separation distance referring to the plane position transition data 242 (step SD12). As explained above, the deterioration/improvement point separation distance is the separation distance between the plane position of the vehicle 2 at the deterioration timing and the plane position of the vehicle 2 at the improvement timing.

Subsequently, the information processing section 203 discriminates whether the detected deterioration/improvement point separation distance is smaller than a deterioration/improvement point distance threshold, which is a threshold decided in advance (step SD13).

If the deterioration/improvement point separation distance is not smaller than the deterioration/improvement point distance threshold (NO in step SD13), the information processing section 203 stops the processing without detecting the entrance timing (step SD14). The processing in step SD14 is executed because of a reason same as the reason for the processing in step SB6.

If the deterioration/improvement point separation distance is smaller than the deterioration/improvement point distance threshold (YES in step SD13), the information processing section 203 sets the improvement timing as the entrance timing (step SD15).

By executing the second entrance timing detection processing shown in the flowchart B of FIG. 5 and detecting the entrance timing, the information processing section 203 can appropriately detect the entrance timing reflecting the characteristic of the transition of the GPS accuracy at the time when the vehicle 2 travels on the parking route and is parked in the multi-storey parking structure.

The service providing server 7 is explained.

The service providing server 7 has a function of providing a service for notifying the user, who parks the vehicle 2 in the multi-storey parking structure, of beneficial information concerning the multi-storey parking structure. Specifically, in response to an inquiry from the user, the service providing server 7 provides a service for notifying the user of at least information indicating a floor level where the vehicle 2 is parked in the multi-storey parking structure.

The service can also be realized by, for example, a method explained below. Concerning a multi-storey parking structure present on a map, an operator constructs a database including information necessary for providing the service. Subsequently, the operator causes the service providing server 7 to store the database. The service providing server 7 provides the service on the basis of the stored database.

However, the method has a problem explained below. The number of multi-storey parking structures present on the map is extremely large. Therefore, extremely large labor is required to investigate, concerning each of the multi-storey parking structures, information necessary for the provision of the service and construct the database on the basis of a result of the investigation.

Taking the above into account, the service providing server 7 according to this embodiment collects information necessary for the provision of the service, updates a multi-storey-parking-structure database as appropriate on the basis of the collected information, and constructs a multi-storey-parking-structure database 421 (explained below). The service providing server 7 provides the service on the basis of the constructed multi-storey-parking-structure database 421.

In the following explanation, the operations of the apparatuses including the service providing server 7 are explained concerning each of a stage for constructing the multi-storey-parking-structure database 421 and a stage for providing the service on the basis of the constructed multi-storey-parking-structure database 421.

Stage for Constructing the Multi-Storey-Parking-Structure Database 421

Figure 7:
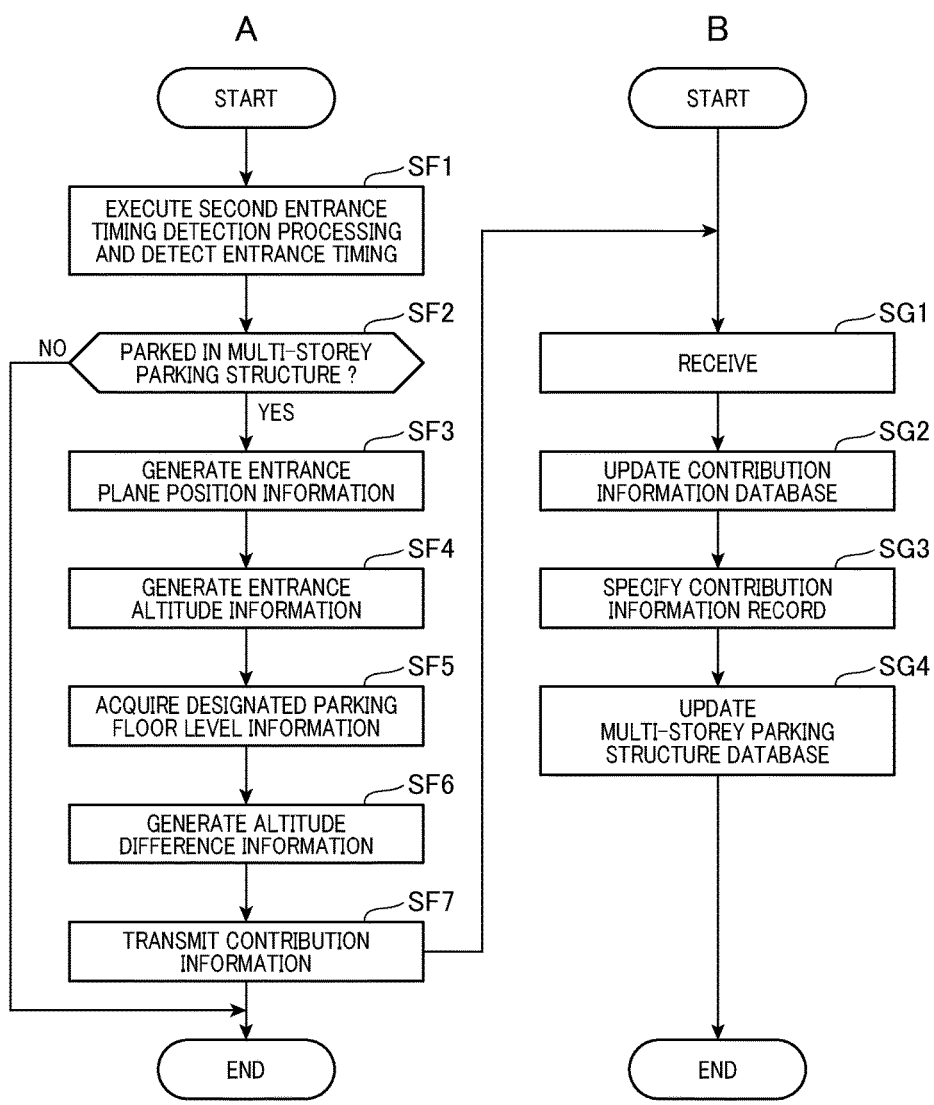
FIG. 7 is a diagram showing a flowchart for explaining the operation of the portable terminal and a flowchart for explaining the operation of a service providing server.

FIG. 7 is a diagram showing flowcharts for explaining the operations of the portable terminal 4 and the service providing server 7 in the stage for constructing the multi-storey-parking-structure database 421. A flowchart A of FIG. 7 shows the operation of the portable terminal 4. A flow chart B of FIG. 7 shows the operation of the service providing server 7.

Note that the operation of the portable terminal 4 shown in the flowchart A of FIG. 7 is performed according to the parking of the vehicle 2.

The portable terminal 4 includes, as an operation mode, a "contribution mode" for performing processing shown in the flowchart A of FIG. 7. The user can execute, with predetermined means, switching of the operation mode to the contribution mode. At a start point of the flowchart A of FIG. 7, the operation mode of the portable terminal 4 is the "contribution mode".

Note that the switching of the operation mode may be automatically performed rather than being manually performed by the user. For example, a configuration may be adopted in which the service providing server 7 transmits, according to a state of the multi-storey-parking-structure database 421, information for instructing the switching of the operation mode to the portable terminal 4 and the portable terminal 4 automatically switches the operation mode on the basis of the received information.

As shown in the flowchart A of FIG. 7, the information processing section 203 of the portable terminal 4 executes the second entrance timing detection processing according to the parking of the vehicle 2 and detects the entrance timing (step SF1). In this way, when the operation mode is the contribution mode, the information processing section 203 executes the second entrance timing detection processing according to the parking of the vehicle 2. Note that, as explained above, when the vehicle 2 is not parked in the multi-storey parking structure or when the vehicle 2 is unlikely to be parked in the multi-storey parking structure, the detection of the entrance timing is not performed.

Subsequently, the information processing section 203 discriminates on the basis of a result of the processing in step SF1 whether the vehicle 2 is parked in the multi-storey parking structure (step SF2).

If the vehicle 2 is not parked in the multi-storey parking structure (NO in step SF2), the information processing section 203 ends the processing.

If the vehicle 2 is parked in the multi-storey parking structure (YES in step SF2), the information processing section 203 detects the plane position of the vehicle 2 detected by the GPS processing section 201 at the entrance timing and generates entrance plane position information indicating the detected plane position (step SF3). The plane position of the vehicle 2 at the entrance timing corresponds to the entrance point of the multi-storey parking structure.

Subsequently, the information processing section 203 detects the altitude of the vehicle 2 detected by the altitude detecting section 202 at the entrance timing and generates entrance altitude information indicating the detected altitude (step SF4). The altitude of the vehicle 2 at the entrance timing corresponds to the altitude of the entrance point of the multi-storey parking structure.

Subsequently, in the second entrance timing detection processing, the information processing section 203 acquires the designated parking floor level information received from the wearable terminal 5 (step SF5). As explained above, the designated parking floor level information is information indicating a floor level where the vehicle 2 is parked.

Subsequently, the information processing section 203 detects an altitude difference between the altitude of the vehicle 2 at the entrance timing and the altitude of the vehicle 2 at the parking timing and generates altitude difference information indicating the detected altitude difference (step SF6). The processing in step SF6 is explained in detail below.

In step SF6, the information processing section 203 detects, referring to the altitude transition data 243, the altitude of the vehicle 2 detected by the altitude detecting section 202 at the parking timing. The altitude of the vehicle 2 at the parking timing corresponds to the altitude of the parking point of the multi-storey parking structure.

Subsequently, the information processing section 203 detects, as the altitude difference, a "difference" between the detected altitude of the vehicle 2 at the parking timing and the altitude of the vehicle 2 at the entrance timing detected in step SF4.

The altitude difference detected in this way is a value having extremely high accuracy as the height of the parking point based on the entrance point. This is because the altitude of the vehicle 2 at the entrance timing and the altitude of the vehicle 2 at the parking timing are detected by the same apparatus (in this example, the portable terminal 4). If the altitude of the vehicle 2 at the entrance timing and the altitude of the vehicle 2 at the parking timing are detected by different apparatuses, it is likely that an error deriving from individual differences and performance differences of the apparatuses occurs. Such an error does not occur in the altitude difference detected in step SF6.

The altitude difference represents the relative height of the parking point (a measurement target point) based on the entrance point (a reference point) at the time when the entrance point is set as the reference point and the parking point is set as the measurement target point. When the relative height of the measurement target point is detected on the basis of the reference point in this way, as a separation distance between the reference point and the measurement target point is smaller, it is possible to detect the relative height at higher accuracy. This is because the influence of atmospheric pressure fluctuation is smaller as the separation distance between the reference point and the measurement target point is smaller. The entrance point and the parking point are present in a region of the same multi-storey parking structure. These points are close to each other. Atmospheric pressure fluctuation that occurs between the points is negligibly small.

Similarly, when the relative height of the measurement target point is detected on the basis of the reference point, as an elapsed time between timing when height is detected at the reference point and timing when height is detected at a specific target point is smaller, it is possible to detect the relative height at higher accuracy. This is because the influence of atmospheric pressure difference is smaller as the elapsed time is smaller. The elapsed time between the entrance timing and the parking timing is time required by the vehicle 2 from the entrance into the multi-storey parking structure until the parking. The elapsed time is extremely short. Atmospheric pressure fluctuation due to a temporal difference of the timings is negligibly small.

Subsequently, the information processing section 203 generates contribution information including the entrance plane position information, the entrance altitude information, the designated parking floor level information, and the altitude difference information and transmits the contribution information to the service providing server 7 (step SF7). Information necessary for transmitting the contribution information (an address of a transmission destination, a communication protocol in use, etc.) is registered in the portable terminal 4 beforehand.

The designated parking floor level information included in the contribution information is equivalent to "parking floor level information". The entrance plane position information included in the contribution information is equivalent to "entrance position information".

As shown in the flowchart B of FIG. 7, the server control section 40 of the service providing server 7 receives the contribution information (step SG1).

Subsequently, the server control section 40 updates, on the basis of the received contribution information, a contribution information database 422 stored by the server storing section 42 (step SG2).

The contribution information database 422 is a database that cumulatively stores the contribution information received from the portable terminal 4. In step SG2, the server control section 40 generates, in the contribution information database 422, at least one record including the contribution information.

In the following explanation, the record included in the contribution information database 422 is referred to as "contribution information record". The contribution information received in step SG1 is referred to as "received contribution information".

Subsequently, the server control section 40 specifies, referring to the contribution information database 422, a contribution information record related to an entrance same as the entrance related to the received contribution information among contribution information records included in the database (step SG3).

Note that the entrance related to the received contribution information means an entrance of the multi-storey parking structure that the vehicle 2 entered in generation of the received contribution information. The entrance related to the contribution information record means an entrance of the multi-storey parking structure related to contribution information on which the contribution information record is based.

In step SG3, the server control section 40 acquires the entrance plane position information and the entrance altitude information included in the contribution information received in step SG1.

Subsequently, the server control section 40 specifies, from the contribution information record included in the contribution information database 422, a contribution information record that satisfies both of two conditions explained below. A first condition: a plane position indicated by the entrance plane position information included in the contribution information record is present within a predetermined range centering on a plane position indicated by the acquired entrance plane position information. A second condition: altitude indicated by the entrance altitude information included in the contribution information record is within a predetermined range centering on altitude indicated by the acquired entrance altitude information.

When the contribution information record satisfies the first condition and the second condition in a relation with the received contribution information, it is highly likely that the entrance related to the received contribution information and the entrance related to the contribution information record are the same. This is because, in this case, the plane positions of these entrances are close to each other and the altitudes of these entrances are close to each other. That is, discrimination concerning whether the first condition and the second condition are satisfied is performed for the purpose of discriminating whether the entrance related to the received contribution information and the entrance related to the contribution information record are the same. Note that, as the predetermined range in the first condition and the predetermined range in the second condition, appropriate values are respectively set under the viewpoint that the first condition and the second condition are conditions for discriminating whether the entrance related to the received contribution information and the entrance related to the contribution information record are the same.

Concerning the discrimination concerning whether the entrance related to the received contribution information and the entrance related to the contribution information record are the same, not only the plane positions but also the altitudes are taken into account because of a reason explained below. In the multi-storey parking structure, entrances are sometimes provided in a plurality of floor levels. The entrances in the plurality of floor levels are sometimes provided in the multi-storey parking structure in a state in which plane positions of the entrances are the same or close to one another. Even in such a case, by performing the discrimination concerning whether the entrance related to the received contribution information and the entrance related to the contribution information record are the same taking into account the altitudes, it is possible to distinguish, as different entrances, the respective entrances provided in the different floor levels of the same multi-storey parking structure.

Note that, in the processing in step SG3, in some case, there is no specified contribution information record. In this case, the server control section 40 discriminates that a corresponding contribution information record is absent.

Subsequently, the server control section 40 updates the multi-storey-parking-structure database 421 on the basis of the received contribution information and the contribution information record specified in step SG3 (step SG4). The processing in step SG4 is explained in detail below.

The multi-storey-parking-structure database 421 is a database including a record for each of the entrances on the basis of the contribution information received by the service providing server 7. For the different entrances provided in the same multi-storey parking structure, different records are respectively registered in the multi-storey-parking-structure database 421.

Figure 8:
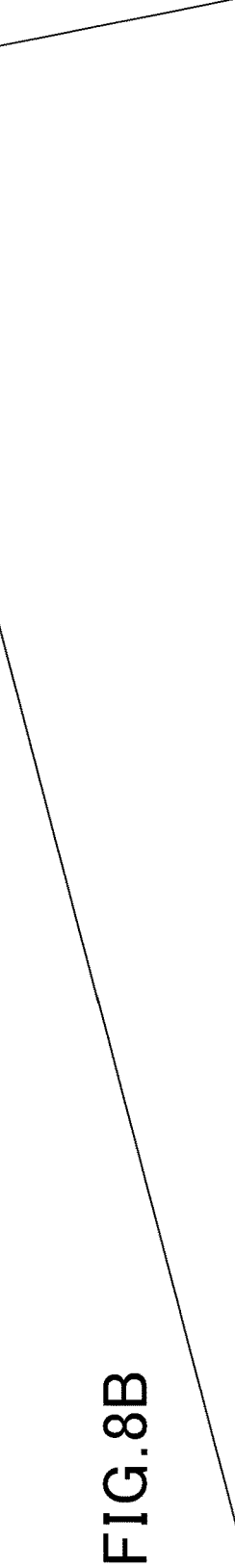
FIG. 8A is a diagram showing a multi-storey-parking-structure database.
FIG. 8B is a diagram showing a multi-storey-parking-structure record.

FIG. 8A is a diagram schematically showing information included in one record of the multi-storey-parking-structure database 421.

In the following explanation, the record of the multi-storey-parking-structure database 421 is referred to as "multi-storey-parking-structure record".

As shown in FIG. 8A, the multi-storey-parking-structure record includes entrance identification information. The entrance identification information is information having a unique value for each of the entrances (for each of multi-storey-parking-structure records) in order to identify the entrances.

The multi-storey-parking-structure record includes entrance related information. The entrance related information includes average entrance latitude information, average entrance longitude information, average entrance altitude information, and contribution state information.

The average entrance latitude information is information indicating an average of the latitude of an entrance indicated by entrance plane position information of contribution information received by the service providing server 7 concerning a corresponding entrance.

The average entrance longitude information is information indicating an average of the longitude of an entrance indicated by entrance plane position information of contribution information received by the service providing server 7 concerning a corresponding entrance.

The average entrance altitude information is information indicating an average of the altitude of an entrance indicated by entrance altitude information of contribution information received by the service providing server 7 concerning a corresponding entrance.

The contribution state information is information indicating whether a sufficient number of pieces of contribution information for providing a service explained below are received concerning a corresponding entrance. The contribution state information takes a value indicating that the sufficient number of pieces of contribution information are received or a value indicating that the sufficient number of pieces of contribution information is not received.

The multi-storey-parking-structure record includes floor level related information. As shown in FIG. 8B, the floor level related information includes floor level detailed information for each of the floor levels. The floor level detailed information includes average altitude difference information, standard deviation information, and number-of-contributions information.

The average altitude difference information is information indicating an average of an altitude difference indicated by altitude difference information of contribution information received by the service providing server 7 concerning a corresponding floor level in a multi-storey parking structure in which a corresponding entrance is provided.

The standard deviation information is information indicating a standard deviation of an altitude difference indicated by altitude difference information of contribution information received by the service providing server 7 concerning a corresponding floor level in a multi-storey parking structure in which a corresponding entrance is provided.

The number-of-contributions information is information indicating the number of pieces of contribution information received by the service providing server 7 concerning a corresponding floor level in a multi-storey parking structure in which a corresponding entrance is provided.

When there is no contribution information record specified in step SG3, in step SG4, the server control section 40 executes processing explained below.

The server control section 40 registers one multi-storey-parking-structure record anew in the multi-storey-parking-structure database 421.

In the multi-storey-parking-structure record registered anew, the server control section 40 sets a value of the entrance identification information to a unique value different from the entrance identification information of the other records.

In the multi-storey-parking-structure record registered anew, the server control section 40 sets a value of the average entrance latitude information to the latitude of the entrance indicated by the entrance plane position information of the received contribution information.

In the multi-storey-parking-structure record registered anew, the server control section 40 sets a value of the average entrance longitude information to the longitude of the entrance indicated by the entrance plane position information of the received contribution information.

In the multi-storey-parking-structure record registered anew, the server control section 40 sets a value of the average entrance altitude information to the altitude of the entrance indicated by the entrance altitude information of the received contribution information.

In the multi-storey-parking-structure record registered anew, the server control section 40 sets a value of the contribution state information to a value indicating that the sufficient number of pieces of contribution information are not received.

In the multi-storey-parking-structure record registered anew, the server control section 40 adds floor level detailed information of the floor level indicated by the designated parking floor level information to the floor level related information.

Concerning the floor level detailed information to be added, the server control section 40 sets a value of the average altitude difference information to the altitude difference indicated by the altitude difference information of the received contribution information.

Concerning the floor level detailed information to be added, the server control section 40 sets the standard deviation information to a null value.

Concerning the floor level detailed information to be added, the server control section 40 sets a value of the number-of-contributions information to "1".

On the other hand, when there are one or more contribution information records specified in step SG3, in step SG4, the server control section 40 executes processing explained below.

The server control section 40 specifies a record corresponding to the entrance related to the received contribution information among the multi-storey-parking-structure records of the multi-storey-parking-structure database 421.

In the specified multi-storey-parking-structure record, the server control section 40 sets a value of the average entrance latitude information to an average of the latitude indicated by the entrance plane position information of the received contribution information and the latitude indicated by the entrance plane position information of each of the contribution information records specified in step SG3.

In the specified multi-storey-parking-structure record, the server control section 40 sets a value of the average entrance longitude information to an average of the longitude indicated by the entrance plane position information of the received contribution information and the longitude indicated by the entrance plane position information of each of the contribution information records specified in step SG3.

In the specified multi-storey-parking-structure record, the server control section 40 sets a value of the average entrance altitude information to an average of the altitude indicated by the entrance altitude information of the received contribution information and the altitude indicated by the entrance altitude information of each of the contribution information records specified in step SG3.

The server control section 40 discriminates, with predetermined means, concerning floor levels of a multi-storey parking structure in which a corresponding entrance is provided, whether contribution information is received sufficiently for providing a service explained below. The server control section 40 sets the contribution state information to a value corresponding to a discrimination result.

The server control section 40 discriminates whether the floor level detailed information of the floor level indicated by the designated parking floor level information is present in the floor level related information of the specified multi-storey-parking-structure record.

When the floor level detailed information is absent, the server control section 40 adds the floor level detailed information to the floor level related information with a method same as the method in registering the multi-storey-parking-structure record anew.

When the floor level detailed information is present, concerning corresponding floor level detailed information, the server control section 40 updates a value of the average altitude difference information on the basis of the altitude difference indicated by the altitude difference information of the received contribution information.

Concerning corresponding floor level detailed information, the server control section 40 updates a value of the standard deviation information on the basis of the altitude difference indicated by the altitude difference information of the received contribution information.

Concerning corresponding altitude difference information, the server control section 40 increments a value of the number-of-contributions information.

As explained above, the server control section 40 of the service providing server 7 receives the contribution information from the portable terminal 4 and updates the multi-storey-parking-structure database 421 on the basis of the received contribution information to thereby construct the multi-storey-parking-structure database 421.

Stage for Providing a Service on the Basis of the Constructed Multi-Storey-Parking-Structure Database 421

The operations performed by the apparatuses including the service providing server 7 when the service providing server 7 provides a service on the basis of the multi-storey-parking-structure database 421 are explained.

First, the operation of the portable terminal 4 serving as a premise for provision of a service by the service providing server 7 is explained.

Figure 9:
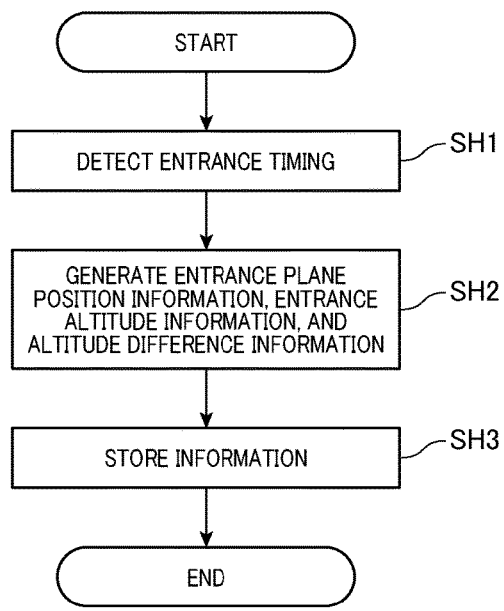
FIG. 9 is a flowchart for explaining the operation of the portable terminal.

FIG. 9 is a flowchart for explaining the operation of the portable terminal 4.

Note that the operation of the portable terminal 4 shown in the flowchart of FIG. 9 is performed according to the parking of the vehicle 2.

The portable terminal 4 includes, as the operation mode, a "correspondence mode" for performing processing shown in the flowchart of FIG. 9. The user can execute, with predetermined means, switching of the operation mode to the correspondence mode. At a start point of the flowchart of FIG. 9, the operation mode of the portable terminal 4 is the "correspondence mode".

Note that the switching of the operation mode may be automatically performed rather than being manually performed by the user. For example, a configuration may be adopted in which the service providing server 7 transmits, according to a state of the multi-storey-parking-structure database 421, information for instructing the switching of the operation mode to the portable terminal 4 and the portable terminal 4 automatically switches the operation mode on the basis of the received information.

As shown in FIG. 9, the information processing section 203 of the portable terminal 4 executes, according to the parking of the vehicle 2, the first entrance timing detection processing explained above and detects the entrance timing (step SH1). When the operation mode is the correspondence mode in this way, the information processing section 203 executes the first entrance timing detection processing according to the parking of the vehicle 2. Note that, as explained above, when the vehicle 2 is not parked in the multi-storey parking structure or when the vehicle 2 is unlikely to be parked in the multi-storey parking structure, the detection of the entrance timing is not performed.

Subsequently, the information processing section 203 generates, on the basis of the entrance timing detected by the first entrance timing detection processing, with a method same as the method explained above, entrance plane position information, entrance altitude information, and altitude difference information (step SH2).

Subsequently, the information processing section 203 stores the entrance plane position information, the entrance altitude information, and the altitude difference information generated in step SH2 in a predetermined storage region (step SH3).

A service provided by the service providing server 7 and the operations performed by the apparatuses when the server provides the service are explained.

Usually, the user who parked the vehicle 2 in the multi-storey parking structure moves away from the multi-storey parking structure after parking the vehicle 2 and performs desired activities such as shopping and sightseeing. When the user returns to the multi-storey parking structure and gets on the vehicle 2 again, in order to smoothly move to a floor level where the vehicle 2 is parked, the user sometimes desires to acquire the floor level where the vehicle 2 is parked in the multi-storey parking structure.

Taking the above into account, the service providing server 7 provides, on the basis of the constructed multi-storey-parking-structure database 421, a service for notifying information concerning a position where the vehicle 2 is parked in the multi-storey parking structure.

FIG. 10 is a diagram showing flowcharts for explaining the operations performed by the wearable terminal 5, the portable terminal 4, and the service providing server 7 when the service providing server 7 provides a service. A flowchart A of FIG. 10 shows the operation of the wearable terminal 5. A flowchart B of FIG. 10 shows the operation of the portable terminal 4. A flowchart C of FIG. 10 shows the operation of the service providing server 7.

As a premise of the flowcharts of FIG. 10, it is assumed that the user is present in a position away from the multi-storey parking structure after parking the vehicle 2 in the multi-storey parking structure and desires to acquire the position of the multi-storey parking structure and a floor level where the vehicle 2 is parked.

As shown in the flowchart A of FIG. 10, the user performs predetermined operation on the wearable terminal 5 and instructs display of information indicating the position of the multi-storey parking structure and information indicating the floor level where the vehicle 2 is parked (step SX2).

When detecting that the instruction in step SX2 is given, the wearable-terminal control section 30 of the wearable terminal 5 transmits, to the portable terminal 4, information indicating that the instruction in step SX2 is given (step SI1).

As shown in the flowchart B of FIG. 10, the information processing section 203 of the portable terminal 4 receives, from the wearable terminal 5, the information indicating that the instruction in step SX2 is given (step SJ1).

Subsequently, the information processing section 203 transmits, to the service providing server 7, floor level response request information including the entrance plane position information (the entrance position information), the entrance altitude information, and the altitude difference information stored in the predetermined storage region in step SH3 of the flowchart of FIG. 9 and inquiring about a floor level of the multi-storey parking structure where the vehicle 2 is parked (step SJ2).

As shown in the flowchart C of FIG. 10, the server control section 40 of the service providing server 7 receives the floor level response request information (step SK1).

Subsequently, the server control section 40 refers to the multi-storey-parking-structure database 421 (step SK2).

Subsequently, the server control section 40 specifies a corresponding multi-storey-parking-structure record among the multi-storey-parking-structure records of the multi-storey-parking-structure database 421 on the basis of a comparison between the average entrance latitude information, the average entrance longitude information, and the average entrance altitude information of the entrance related information included in the multi-storey-parking-structure records of the multi-storey-parking-structure database 421 and the entrance plane position information (the entrance position information) and the entrance altitude information included in the floor level response request information (step SK3).

Note that, when the corresponding multi-storey-parking-structure record is absent in the multi-storey-parking-structure database 421 or when a value of the contribution state information of the specified multi-storey-parking-structure record is a value indicating that the sufficient number of pieces of contribution information are not received, the server control section 40 performs corresponding processing. For example, the server control section 40 transmits, to the portable terminal 4, information indicating that accumulation of information for providing a service is insufficient in the service providing server 7 and the server control section 40 cannot respond. The portable terminal 4 communicates with the wearable terminal 5 according to reception of the information and causes the wearable terminal 5 to display information indicating that the accumulation of the information for providing the service is insufficient.

In the following explanation, it is assumed that the corresponding multi-storey-parking-structure record is present in the multi-storey-parking-structure database 421 and the value of the contribution state information of the specified multi-storey-parking-structure record is a value indicating that the sufficient number of pieces of contribution information are received.

Subsequently, the server control section 40 discriminates, on the basis of the altitude difference information included in the received floor level response request information and the floor level related information included in the multi-storey-parking-structure record specified in step SK3, a floor level where the vehicle 2 is parked in the multi-storey parking structure (step SK4).

Specifically, the server control section 40 compares a value of the altitude difference information included in the received floor level response request information and a value of the average altitude difference information of each of the kinds of the floor level detailed information of the floor levels included in the floor level related information. In the comparison, the server control section 40 performs the comparison reflecting a standard deviation indicated by corresponding standard deviation information. Subsequently, the server control section 40 detects average altitude information having a value most approximate to the value of the altitude difference information included in the received floor level response request information. Subsequently, the server control section 40 discriminates that a floor level corresponding to the average altitude difference information having the value most approximate to the value of the altitude difference information included in the received floor level response request information is the floor level where the vehicle 2 is parked.

Subsequently, the server control section 40 transmits, to the portable terminal 4, the floor level response information indicating the floor level where the vehicle 2 is parked discriminated in step SK4 (step SK5).

As shown in the flowchart B of FIG. 10, the information processing section 203 of the portable terminal 4 receives the floor level response information (step SJ3).

Subsequently, the information processing section 203 generates, on the basis of the entrance plane position information stored in the predetermined storage region, rendering data for displaying a map showing a route from the present position of the portable terminal 4 (i.e., the present position of the user) to a position indicated by the entrance plane position information (i.e., the position of the entrance of the multi-storey parking structure) (step SJ4). For example, the portable terminal 4 communicates with the in-vehicle device 3, acquires information necessary for the generation of the rendering data, and generates the rendering data. For example, the portable terminal 4 communicates with a predetermined server connected to the network N, acquires the information necessary for the generation of the rendering data, and generates the rendering data. A method of generating the rendering data may be any method.

Subsequently, the information processing section 203 transmits the rendering data generated in step SJ4 and the information indicating the floor level indicated by the received floor level response information to the wearable terminal 5 (step SJ5).

As shown in the flowchart A of FIG. 10, the wearable-terminal control section 30 of the wearable terminal 5 receives the rendering data and the information indicating the floor level (step SJ2).

Subsequently, the wearable-terminal control section 30 causes, on the basis of the received rendering data, the wearable-terminal touch panel 33 to display the map showing the route from the position of the user to the position of the entrance of the multi-storey parking structure (step SJ3). The wearable-terminal control section 30 displays, on the basis of the received information indicating the floor level, the information indicating the floor level not to overlap the route shown on the map (step SJ3).

The user can recognize the route from the present position of the user to the entrance of the multi-storey parking structure by referring to the wearable-terminal touch panel 33. The user can recognize the floor level where the vehicle 2 is parked in the multi-storey parking structure by referring to the wearable-terminal touch panel 33.

Note that, in this embodiment, the portable terminal 4 detects the entrance timing and generates and stores the entrance plane position information, the entrance altitude information, and the altitude difference information according to the parking of the vehicle 2. The portable terminal 4 transmits, according to the instruction of the user desiring to recognize the floor level where the vehicle 2 is parked, the stored respective kinds of information to the service providing server 7 and receives the floor level response information from the service providing server 7. However, the portable terminal 4 may be configured as explained below.

Rather than performing the generation and the storage of the respective kinds of information explained above according to the parking of the vehicle 2, the portable terminal 4 may perform the generation of the information and transmission of the information to the service providing server 7 according to the instruction of the user desiring to recognize the floor level where the vehicle 2 is parked.

Further, the portable terminal 4 may be configured as explained below. The portable terminal 4 associates the information with identification information of the portable terminal 4 and transmits the information to the service providing server 7 without generating and storing the information according to the parking of the vehicle 2. The service providing server 7 stores the information for identifying the portable terminal 4 and the information in association with each other. The portable terminal 4 transmits, according to the instruction of the user desiring to recognize the floor level where the vehicle 2 is parked, information including the identification information of the portable terminal 4 and requesting a response of the floor level to the service providing server 7. The service providing server 7 transmits the floor level response information to the portable terminal 4 according to the request for the response.

As explained above, the portable terminal 4 (the information processing apparatus) according to this embodiment includes the GPS unit 21 (the GPS receiving section) that receives a GPS signal, the GPS processing section 201 that detects GPS accuracy at an interval and detects the position of the vehicle 2 on the basis of the GPS signal received by the GPS unit 21, and the information processing section 203 that detects, on the basis of transition of the GPS accuracy detected by the GPS processing section 201 at an interval, the entrance timing, which is the timing when the GPS accuracy is detected when the vehicle 2 is located at the entrance point of the multi-storey parking structure (the multi-level structure).

With this configuration, the portable terminal 4 can appropriately detect the timing (the entrance timing), which is the timing when the vehicle 2 is located at the entrance point of the multi-storey parking structure, making use of the fact that the GPS accuracy characteristically transitions when the vehicle 2 enters the multi-storey parking structure and is parked.

In this embodiment, in the first entrance timing detection processing, the information processing section 203 detects, on the basis of the transition of the GPS accuracy detected by the GPS processing section 201 at an interval, the deterioration timing, which is the timing when the GPS accuracy deteriorates to exceed the deterioration determination accuracy threshold first, tracking back from the parking timing, which is the timing when the GPS accuracy is detected when the vehicle 2 is located at the parking point in the multi-storey parking structure. Further, the information processing section 203 detects the improvement timing, which is the timing when the GPS accuracy improves to be smaller than the improvement determination accuracy threshold TH1, which is smaller than the deterioration determination accuracy threshold, first, tracking back from the deterioration timing and sets the improvement timing as the entrance timing.

With this configuration, the portable terminal 4 can appropriately detect the entrance timing making use of the characteristic of the transition of the GPS accuracy at the time when the vehicle 2 enters the multi-storey parking structure and is parked.

In this embodiment, in the first entrance timing detection processing, when the separation distance between the position of the vehicle 2 at the parking timing and the position of the vehicle 2 at the deterioration timing is smaller than the parking/deterioration point distance threshold, the information processing section 203 sets the improvement timing as the entrance timing.

With this configuration, the portable terminal 4 can appropriately detect the entrance timing after accurately detecting that the vehicle 2 is parked in the multi-storey parking structure.

In this embodiment, in the first entrance timing detection processing, when the separation distance between the position of the vehicle 2 at the deterioration timing and the position of the vehicle 2 at the improvement timing is smaller than the deterioration/improvement point distance threshold, the information processing section 203 sets the improvement timing as the entrance timing.

With this configuration, the portable terminal 4 can appropriately detect the entrance timing after accurately detecting that the vehicle 2 is parked in the multi-storey parking structure.

In this embodiment, in the first entrance timing detection processing, when the altitude of the vehicle 2 detected by the altitude detecting section 202 at the parking timing and the altitude of the vehicle 2 detected by the altitude detecting section 202 at the improvement timing are larger than the altitude threshold, the information processing section 203 sets the improvement timing as the entrance timing.

With this configuration, the portable terminal 4 can appropriately detect the entrance timing after accurately detecting that the vehicle 2 is parked in the multi-storey parking structure.

In this embodiment, in the second entrance timing detection processing, the information processing section 203 acquires the floor level where the vehicle 2 is parked input from the user, detects, on the basis of the acquired floor level where the vehicle 2 is parked, the transition of the altitude of the vehicle 2 detected by the altitude detecting section 202 at an interval, and the floor level width decided in advance as the width in the height direction between the floor levels in the multi-storey parking structure, the second-floor vicinity timing, which is the timing when the altitude corresponding to the altitude of the second floor of the multi-storey parking structure is detected as the altitude of the vehicle 2 first, tracking back from the parking timing, detects the deterioration timing when the GPS accuracy deteriorates to exceed the deterioration determination accuracy threshold first tracking back from the second-floor vicinity timing, further detects the improvement timing, which is the timing when the GPS accuracy improves to be lower than the improvement determination accuracy threshold TH1, which is smaller than the deterioration determination accuracy threshold, first, tracking back from the deterioration timing, and sets the improvement timing as the entrance timing.

With this configuration, the portable terminal 4 can appropriately detect the entrance timing making use of the characteristic of the transition of the GPS accuracy at the time when the vehicle 2 enters the multi-storey parking structure and is parked.

In this embodiment, in the second entrance timing detection processing, when the separation distance between the position of the vehicle 2 at the second-floor vicinity timing and the position of the vehicle 2 at the deterioration timing is smaller than the second floor/deterioration point distance threshold, the information processing section 203 sets the improvement timing as the entrance timing.

With this configuration, the portable terminal 4 can appropriately detect the entrance timing after accurately detecting that the vehicle 2 is parked in the multi-storey parking structure.

In this embodiment, in the second entrance timing detection processing, when the separation distance between the position of the vehicle 2 at the deterioration timing and the position of the vehicle 2 at the improvement timing is smaller than the deterioration/improvement point distance threshold, the information processing section 203 sets the improvement timing as the entrance timing.

With this configuration, the portable terminal 4 can appropriately detect the entrance timing after accurately detecting that the vehicle 2 is parked in the multi-storey parking structure.

In this embodiment, the information processing section 203 of the portable terminal 4 detects, on the basis of the transition of the GPS accuracy detected by the GPS processing section 201 at an interval, the entrance timing, which is the timing when the GPS accuracy is detected when the vehicle 2 is located at the entrance point of the multi-storey parking structure, detects the altitude difference between the altitude of the vehicle 2 detected by the altitude detecting section 202 at the entrance timing and the altitude of the vehicle 2 detected by the altitude detecting section 202 at the parking timing, which is the timing when the GPS accuracy is detected when the vehicle 2 is located at the parking point in the multi-storey parking structure, and transmits the altitude difference information indicating the detected altitude difference to the service providing server 7 (the server).

The service providing server 7 receives the altitude difference information and executes the processing based on the received altitude difference information.

With this configuration, the portable terminal 4 can appropriately detect the entrance timing making use of the characteristic of the transition of the GPS accuracy at the time when the vehicle 2 enters the multi-storey parking structure and is parked.

Further, the service providing server 7 is capable of providing, by performing the processing based on the received altitude difference information, a beneficial service such as notification of information concerning the multi-storey parking structure making use of the altitude difference information.

In this embodiment, the information processing section 203 of the portable terminal 4 acquires the floor level where the vehicle 2 is parked input from the user and transmits the designated parking floor level information (the parking floor level information) indicating the acquired floor level and the entrance plane position information (the entrance position information) indicating the position of the vehicle 2 at the entrance timing to the service providing server 7 together with the altitude difference information. The server control section 40 of the service providing server 7 receives the designated parking floor level information, the entrance plane position information, and the altitude difference information and causes the server storing section 42 to store the entrance plane position information and the altitude difference information in association with the floor level indicated by the received designated parking floor level information.

With this configuration, the service providing server 7 can provide a beneficial service on the basis of the entrance plane position information and the altitude difference information stored in association with the floor level indicated by the designated parking floor level information.

In this embodiment, the information processing section 203 of the portable terminal 4 transmits, to the service providing server 7, the floor level response request information including the altitude difference information and the entrance plane position information (the entrance position information) and inquiring about the floor level of the multi-storey parking structure where the vehicle 2 is parked. When receiving the floor level response request information, the server control section 40 of the service providing server 7 discriminates, on the basis of the entrance plane position information and the altitude difference information stored in association with the floor level, the floor level of the multi-storey parking structure where the vehicle 2 is parked, and transmits the floor level response information indicating the discriminated floor level to the portable terminal 4.

With this configuration, the service providing server 7 can provide, on the basis of the stored information, according to the inquiry from the portable terminal 4, a service for notifying the floor level of the multi-storey parking structure where the vehicle 2 is parked.

In this embodiment, when receiving the floor level response information, the portable terminal 4 communicates with the wearable terminal 5 and causes the wearable terminal 5 to display the floor level indicated by the floor level response information.

With this configuration, the user can recognize, by referring to the information displayed on the wearable terminal 5, the floor level of the multi-storey parking structure where the user parked the vehicle 2.

Note that, in this embodiment, the portable terminal 4 causes, on the basis of the received floor level response information, the wearable terminal 5 to display the floor level indicated by the floor level response information. However, the portable terminal 4 may be capable of causing, on the basis of the received floor level response information, the in-vehicle device 3 to display the floor level. With this configuration, for example, when the user gets on the parked vehicle 2, starts the vehicle 2, and is about to exit the multi-storey parking structure, when the user desires to surely recognize a floor level where the vehicle 2 is located, by referring to the floor level displayed on the in-vehicle device 3, the user can quickly and surely recognize the floor level where the vehicle 2 is parked.

Note that the embodiment explained above only indicates a form of the present invention and can be optionally modified and applied within the scope of the present invention.

For example, in the embodiment explained above, the portable terminal 4 includes the information processing section 203 and detects the entrance timing. However, the portable terminal 4 does not always need to detect the entrance timing and perform the processing based on the detected entrance timing. For example, the in-vehicle device 3 may have the functions of the information processing section 203 of the portable terminal 4 and functions incidental to the functions and detect the entrance timing. In this configuration, further, the in-vehicle device 3 may communicate with the service providing server 7 via a network, provide the server with the information concerning the multi-storey parking structure, and receive provision of the information concerning the multi-storey parking structure from the server. In this case, the in-vehicle device 3 functions as the "information processing apparatus".

For example, in the embodiment explained above, the multi-storey parking structure is the multi-level structure. However, a structure equivalent to the multi-level structure is not limited to the multi-storey parking structure. That is, the multi-level structure only has to be a structure including a plurality of floor levels where the vehicle 2 can be parked.

For example, the processing units of the flowcharts shown in the figures are divided according to main processing contents in order to facilitate understanding of the processing of the apparatuses. The present invention is not limited by a method of division and names of the processing units. The processing of the apparatuses can also be divided into a larger number of processing units according to processing contents. The processing units can also be divided such that one processing unit includes more processing. The order of the processing of the flowcharts is not limited to the illustrated examples as long as the same processing can be performed.

FIG. 2 is a schematic diagram showing the functional components of the apparatuses included in the information processing system 1 by classifying the functional components according to main processing contents in order to facilitate understanding of the present invention. The components of the apparatuses can also be classified into a larger number of components according to the processing contents. The functional components can also be classified such that one component executes more processing. The processing of the components may be executed by one kind of hardware or may be executed by a plurality of kinds of hardware. The processing of the components may be realized by one computer program or may be realized by a plurality of computer programs.

REFERENCE SIGNS LIST

1 information processing system
2 vehicle
3 in-vehicle device (information processing apparatus)
4 portable terminal (information processing apparatus)
5 wearable terminal
7 service providing server (server)
21 GPS unit (GPS receiving section)
201 GPS processing section
202 altitude detecting section
203 information processing section

What is claimed is:
1. An information processing apparatus that processes information concerning a multi-level structure including a plurality of floor levels where a vehicle can be parked, the information processing apparatus comprising:
   a GPS receiving section configured to receive a GPS signal;
   a GPS processing section configured to detect GPS accuracy at an interval and detect a position of the vehicle on the basis of the GPS signal received by the GPS receiving section; and
   an information processing section configured to detect entrance timing, which is timing when the GPS accuracy is detected when the vehicle is located at an entrance point of the multi-level structure, on the basis of transition of the GPS accuracy detected by the GPS processing section at the interval,
   wherein the information processing section detects, on the basis of the transition of the GPS accuracy detected by the GPS processing section at the interval, deterioration timing, which is timing when the GPS accuracy deteriorates to exceed a deterioration determination accuracy threshold first, tracking back from parking timing, which is timing when the GPS accuracy is detected when the vehicle is parked at a parking point in the multi-level structure, further detects improvement timing, which is timing when the GPS accuracy improves to be smaller than an improvement determination accuracy threshold, which is smaller than the deterioration determination accuracy threshold, first, tracking back from the deterioration timing, and sets the improvement timing as the entrance timing.
2. The information processing apparatus according to claim 1, wherein the information processing section sets the improvement timing as the entrance timing when a separation distance between a position of the vehicle at the parking timing and a position of the vehicle at the deterioration timing is smaller than a parking/deterioration point distance threshold.

3. The information processing apparatus according to claim 2, wherein the information processing section sets the improvement timing as the entrance timing when a separation distance between the position of the vehicle at the deterioration timing and a position of the vehicle at the improvement timing is smaller than a deterioration/improvement point distance threshold.

4. An information processing apparatus that processes information concerning a multi-level structure including a plurality of floor levels where a vehicle can be parked, the information processing apparatus comprising:
a GPS receiving section configured to receive a GPS signal;
a GPS processing section configured to detect GPS accuracy at an interval and detect a position of the vehicle on the basis of the GPS signal received by the GPS receiving section;
an information processing section configured to detect entrance timing, which is timing when the GPS accuracy is detected when the vehicle is located at an entrance point of the multi-level structure, on the basis of transition of the GPS accuracy detected by the GPS processing section at the interval; and
an altitude detecting section configured to detect altitude of the vehicle at an interval corresponding to the interval at which the GPS processing section detects the GPS accuracy, wherein
the information processing section acquires the floor level where the vehicle is parked input from a user, detects, on the basis of the acquired floor level where the vehicle is parked, transition of the altitude of the vehicle detected by the altitude detecting section at the interval, and a floor level width decided in advance as width in a height direction between the floor levels in the multi-level structure, second-floor vicinity timing, which is timing when altitude corresponding to altitude of a second floor of the multi-level structure is detected as the altitude of the vehicle first, tracking back from the parking timing, detects, tracking back from the second-floor vicinity timing, deterioration timing when the GPS accuracy deteriorates to exceed a deterioration determination accuracy threshold first, further detects improvement timing, which is timing when the GPS accuracy improves to be smaller than an improvement determination accuracy threshold, which is smaller than the deterioration determination accuracy threshold, first, tracking back from the deterioration timing, and sets the improvement timing as the entrance timing.

5. The information processing apparatus according to claim 4, wherein the information processing section sets the improvement timing as the entrance timing when a separation distance between a position of the vehicle at the second-floor vicinity timing and a position of the vehicle at the deterioration timing is smaller than a second-floor/deterioration point distance threshold.

6. The information processing apparatus according to claim 5, wherein the information processing section sets the improvement timing as the entrance timing when a separation distance between the position of the vehicle at the deterioration timing and a position of the vehicle at the improvement timing is smaller than a deterioration/improvement point distance threshold.

7. The information processing apparatus according to claim 1, wherein the information processing apparatus is a portable terminal carried by an occupant riding on the vehicle or an in-vehicle device mounted on the vehicle.

8. An information processing system comprising:
a server; and
an information processing apparatus connected to the server via a network and configured to process information concerning a multi-level structure including a plurality of floor levels where a vehicle can be parked,
wherein the information processing apparatus includes:
a GPS receiving section configured to receive a GPS signal;
a GPS processing section configured to detect GPS accuracy at an interval and detect the position of the vehicle on the basis of the GPS signal received by the GPS receiving section;
an altitude detecting section configured to detect altitude of the vehicle at an interval corresponding to the interval at which the GPS processing section detects the GPS accuracy; and
an information processing section configured to detect entrance timing, which is timing when the GPS accuracy is detected when the vehicle is located at an entrance point of the multi-level structure, on the basis of transition of the GPS accuracy detected by the GPS processing section at the interval, detect an altitude difference between the altitude of the vehicle detected by the altitude detecting section at the entrance timing and altitude of the vehicle detected by the altitude detecting section at parking timing, which is timing when the GPS accuracy is detected when the vehicle is located at a parking point in the multi-level structure, and transmit altitude difference information indicating the detected altitude difference to the server, and
the server includes a server control section configured to receive the altitude difference information and execute processing based on the received altitude difference information,
wherein the information processing section detects, on the basis of the transition of the GPS accuracy detected by the GPS processing section at the interval, deterioration timing, which is timing when the GPS accuracy deteriorates to exceed a deterioration determination accuracy threshold first, tracking back from parking timing, which is timing when the GPS accuracy is detected when the vehicle is parked at a parking point in the multi-level structure, further detects improvement timing, which is timing when the GPS accuracy improves to be smaller than an improvement determination accuracy threshold, which is smaller than the deterioration determination accuracy threshold, first, tracking back from the deterioration timing, and sets the improvement timing as the entrance timing.

9. The information processing system according to claim 8, wherein
the information processing section of the information processing apparatus acquires the floor level where the vehicle is parked input from a user and transmits parking floor level information indicating the acquired floor level and entrance position information indicating a position of the vehicle at the entrance timing to the server together with the altitude difference information,
the server further includes a server storing section configured to store information, and the server control section of the server receives the parking floor level information, the entrance position information, and the altitude difference information and causes the server storing section to store the entrance position information and the altitude difference information in association with the floor level indicated by the received parking floor level information.

10. The information processing system according to claim 9, wherein
the information processing section of the information processing apparatus transmits, to the server, floor level response request information including the altitude difference information and the entrance position information and inquiring about the floor level of the multi-level structure where the vehicle is parked, and
when receiving the floor level response request information, the server control section of the server discriminates, on the basis of the entrance position information and the altitude difference information stored in association with the floor level, the floor level of the multi-level structure where the vehicle is parked and transmits floor level response information indicating the discriminated floor level to the information processing apparatus.

11. The information processing system according to claim 10, wherein
the information processing apparatus is communicably connected to a wearable terminal or an in-vehicle device mounted on the vehicle, and
when receiving the floor level response information, the information processing apparatus communicates with the wearable terminal or the in-vehicle device and causes the wearable terminal or the in-vehicle device to display the floor level indicated by the floor level response information.

* * * * *